United States Patent
Takano

(10) Patent No.: US 11,387,889 B2
(45) Date of Patent: Jul. 12, 2022

(54) COMMUNICATION APPARATUS, COMMUNICATION CONTROL METHOD, AND COMPUTER PROGRAM

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 37 days.

(21) Appl. No.: 16/619,962

(22) PCT Filed: May 10, 2018

(86) PCT No.: PCT/JP2018/018112
§ 371 (c)(1),
(2) Date: Dec. 6, 2019

(87) PCT Pub. No.: WO2018/230206
PCT Pub. Date: Dec. 20, 2018

(65) Prior Publication Data
US 2020/0136710 A1    Apr. 30, 2020

(30) Foreign Application Priority Data
Jun. 14, 2017    (JP) .............................. JP2017-116562

(51) Int. Cl.
*H04B 7/06* (2006.01)
*H04B 7/0452* (2017.01)
(Continued)

(52) U.S. Cl.
CPC ......... *H04B 7/0695* (2013.01); *H04B 7/0452* (2013.01); *H04B 7/0617* (2013.01); *H04W 16/28* (2013.01); *H04W 72/046* (2013.01)

(58) Field of Classification Search
CPC .. H04B 7/0695; H04B 7/0452; H04B 7/0617; H04W 16/28; H04W 72/046
(Continued)

(56) References Cited

U.S. PATENT DOCUMENTS

| 2015/0358129 A1 | 12/2015 | Ryu et al. |
| 2016/0028519 A1* | 1/2016 | Wei ...................... H04B 7/0695 375/267 |

(Continued)

FOREIGN PATENT DOCUMENTS

| JP | 2010-541506 A | 12/2010 |
| JP | 2014-179776 A | 9/2014 |

(Continued)

OTHER PUBLICATIONS

International Search Report and Written Opinion dated Aug. 7, 2018 for PCT/JP2018/018112 filed on May 10, 2018, 8 pages including English Translation of the International Search Report.

(Continued)

*Primary Examiner* — Kevin M Burd
(74) *Attorney, Agent, or Firm* — Xsensus LLP

(57) ABSTRACT

[Object]
Provided is a communication apparatus capable of effectively using resources in a case where transmission is performed with directional beams.

[Solving Means]
Provided is a communication apparatus including a control unit configured to change a setting of scan with a directional beam between beam groups each including a plurality of the directional beams, in which the control unit adjusts the setting of the scan with the directional beam of each of the beam groups depending on a status of an area that the beam group covers.

19 Claims, 23 Drawing Sheets

(51) Int. Cl.
*H04W 16/28* (2009.01)
*H04W 72/04* (2009.01)

(58) Field of Classification Search
USPC .......................................................... 370/329
See application file for complete search history.

(56) References Cited

U.S. PATENT DOCUMENTS

| | | | |
|---|---|---|---|
| 2016/0150435 A1* | 5/2016 | Baek ..................... | H04W 24/10 370/252 |
| 2016/0197659 A1* | 7/2016 | Yu ....................... | H04J 13/0003 370/335 |
| 2018/0048375 A1* | 2/2018 | Guo ..................... | H04B 7/0619 |

FOREIGN PATENT DOCUMENTS

| | | | | |
|---|---|---|---|---|
| JP | 2015-041817 | A | 3/2015 | |
| WO | 2016/121252 | A1 | 8/2016 | |
| WO | 2017/063661 | A1 | 4/2017 | |
| WO | WO-2017063661 | A * | 4/2017 | ............ H04W 48/08 |

OTHER PUBLICATIONS

Extended European Search Report dated Apr. 1, 2020, issued in corresponding European Patent Application No. 18817905.5, 14 pages.
Ericsson: "RRM measurements based on beam-specific mobility RS",3GPP Draft: R2-1700539—RRM Measurements Based On Beamspecific Mobility RS, 3rd Generation Partnership Project(3GPP), Mobile Competence Centre; 650, Route Des LuciolesF-06921 Sophia-Antipolis, vol. RAN WG2, No. Spokane, USA; Jan. 17, 2017-Jan. 19, 2017 Jan. 17, 2017(Jan. 17, 2017), XP051211111,Retrieved from the Internet: URL:http://www.3gpp.org/ftp/Meetings_3GPP_SYNC/RAN2/Docs/ [retrieved on Jan. 17, 2017].

* cited by examiner

COMMUNICATION APPARATUS, COMMUNICATION CONTROL METHOD, AND COMPUTER PROGRAM

CROSS-REFERENCE TO RELATED APPLICATIONS

The present application is based on PCT filing PCT/JP2018/018112, filed May 10, 2018, which claims priority to JP 2017-116562, filed Jun. 14, 2017, the entire contents of each are incorporated herein by reference.

TECHNICAL FIELD

The present disclosure relates to a communication apparatus, a communication control method, and a computer program.

BACKGROUND ART

In the 3GPP (Third Generation Partnership Project), various techniques for improving the capacity of cellular systems have currently been studied in order to accommodate explosively increasing traffic. For example, PTL 1 discloses a technique whose object is to make it possible to achieve better reception quality in a case where transmission is performed with directional beams.

CITATION LIST

Patent Literature

[PTL 1]
WO2016/121252A

SUMMARY

Technical Problem

It is desired to effectively use resources when transmission is performed with directional beams.

In view of this, the present disclosure proposes novel and enhanced communication apparatus, communication control method, and computer program capable of effectively using resources in a case where transmission is performed with directional beams.

Solution to Problem

According to the present disclosure, there is provided a communication apparatus including a control unit configured to change a setting of scan with a directional beam between beam groups each including a plurality of the directional beams, in which the control unit adjusts the setting of the scan with the directional beam of each of the beam groups depending on a status of an area that the beam group covers.

Further, according to the present disclosure, there is provided a communication control method including: changing, by a processor, a setting of scan with a directional beam between beam groups each including a plurality of the directional beams; and adjusting, by the processor, the setting of the scan with the directional beam of each of the beam groups depending on a status of an area that the beam group covers.

Further, according to the present disclosure, there is provided a computer program for causing a computer to execute: changing a setting of scan with a directional beam between beam groups each including a plurality of the directional beams; and adjusting the setting of the scan with the directional beam of each of the beam groups depending on a status of an area that the beam group covers.

Advantageous Effect of Invention

As described above, according to the present disclosure, there can be provided novel and enhanced communication apparatus, communication control method, and computer program capable of effectively using resources in a case where transmission is performed with directional beams.

Note that, the above-mentioned effect is not necessarily limited, and any effect described herein or other effects that may be grasped from the present specification may be provided in addition to the above-mentioned effect or instead of the above-mentioned effect.

DESCRIPTION OF EMBODIMENT

Figure 1:
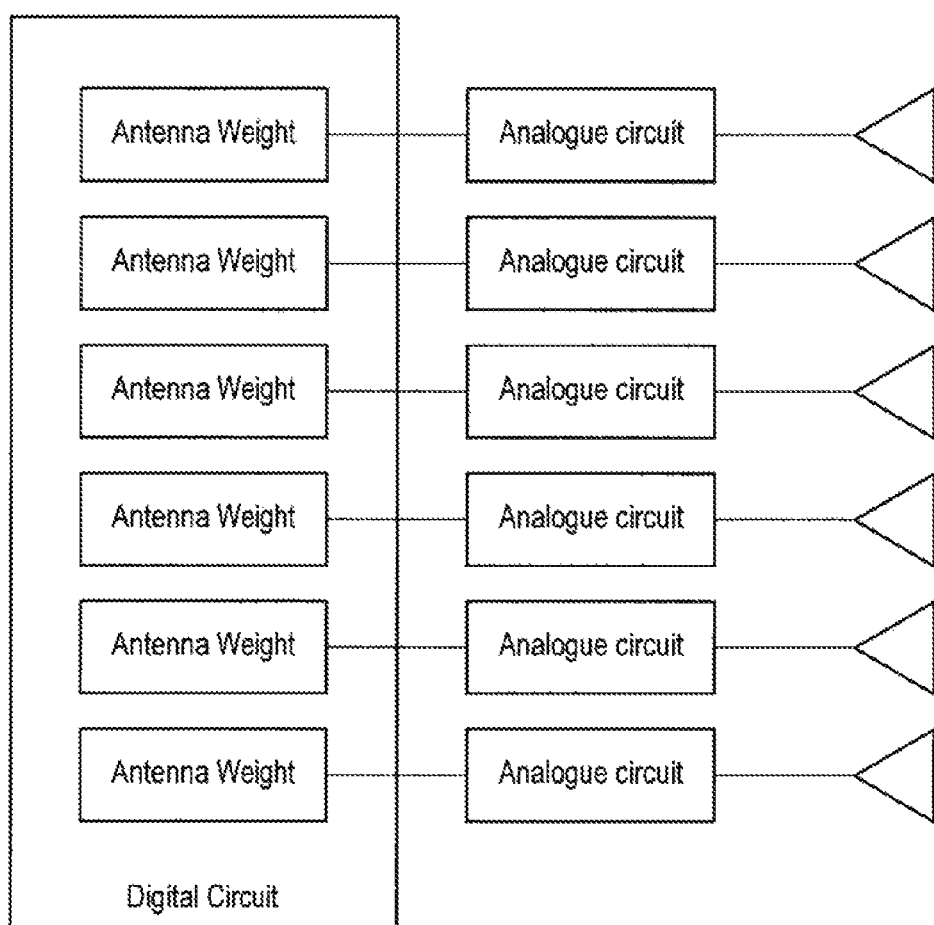
FIG. 1 is an example of a base station in a case where only digital units serve as antenna weights in beamforming.

Now, a preferred embodiment of the present disclosure is described in detail with reference to the attached drawings. Note that, in the present specification and the drawings, components having substantially the same functional configurations are denoted by the same reference signs so that overlapped description is omitted.

Note that, the following items are described in order.
1. Embodiment of Present Disclosure
1.1. Background
1.2. Configuration Example and Operation Example
2. Application Example
3. Conclusion 1. Embodiment of Present Disclosure

[1.1. Background]

Prior to detail description of an embodiment of the present disclosure, the background of the embodiment of the present disclosure is described.

(Codebook-Based Beam)

As described above, in the 3GPP (Third Generation Partnership Project), various techniques for improving the capacity of cellular systems have currently been studied in order to accommodate explosively increasing traffic. With regard to the future wireless communication system (5G) that has been studied in the 3GPP, it is unlikely that a mechanism that steplessly changes a beam emitted by a base station to recreate a beam following a terminal can be provided. This is because calculation cost for recreating a new beam arises. Also in FD-MIMO in 3GPP Rel 13, there has been employed a method that creates beams emitted by a base station in every direction in advance, and selects a beam required for a terminal from the beams created in advance to provide the beam. Such beams are called "codebook based beamforming." To prepare beams at every degree from 0° to 360° in the horizontal direction, 360 types of beams are required. In a case where the beams overlap each other by half, 720 beams, which is twice as many as 360, satisfactorily serve as codebook based beams in the horizontal direction. In addition, in a case where beams at every degree from 0° to 180° in the vertical direction that overlap each other by half are prepared, 360 beams can cover an angle of 180° from −90° to +90° with the horizontal direction being 0°.

(Necessity of Beam Association)

A quite large number of antenna elements, such as 256 (frequency band: 30 GHz) or 1,000 (frequency band: 70 GHz) antenna elements, can be mounted on base stations in the future. When the number of antenna elements increases in this way, very sharp beams can be created through beamforming processing using the antennas. For example, a very sharp beam having a half-value width (indicating the minimum degree at which a gain drops by 3 dB) of 1° or less can be provided from a base station to a terminal.

In order to establish communication between a base station and a terminal, it is necessary to determine what kinds of beams are to be used in the base station. In the case of downlink (DL) communication, it is necessary to determine DL beams to be provided by the base station. Further, in the case of uplink (UL) communication, it is necessary to determine UL beams that the base station is to use in reception. The UL beam, which is the latter, does not mean that the base station transmits radio waves, but means that an antenna that allows the base station to receive radio waves has directivity that is a beam.

(Beam Sweeping)

By sweeping a plurality of beam candidates from a base station (beam sweeping), a terminal observing the beam candidates can determine, of the beams that the base station may use, a beam that the terminal easily receives. Meanwhile, when the terminal transmits a UL RS (Reference Signal) and the base station receives the RS while performing beam sweeping, the base station can determine a reception beam optimal for reception of the signal from the terminal.

(Resource for Performing Beamforming)

FIG. 1 is an example of a base station in a case where only digital units serve as antenna weights in beamforming. The configuration in which only digital units serve as antenna weights in beamforming as described above is called "full-digital antenna architecture." In the case of the full-digital antenna architecture, when Tx sweeping (transmission sweeping) is performed, as many different resources as beams are required. Meanwhile, when Rx sweeping (reception sweeping) is performed, all beams can be simultaneously received in one resource. Thus, in the full-digital antenna architecture, the number of resources in reception sweeping can be small. That is, when full-digital reception sweeping is performed in the base station, a terminal only needs to transmit a UL RS (Resource Signal) corresponding to one resource, and thus consumes electric power a little. "Resource" used herein means an orthogonal resource using a frequency or time. For example, a resource block or resource element of LTE corresponds to "resource" used herein.

Figure 2:
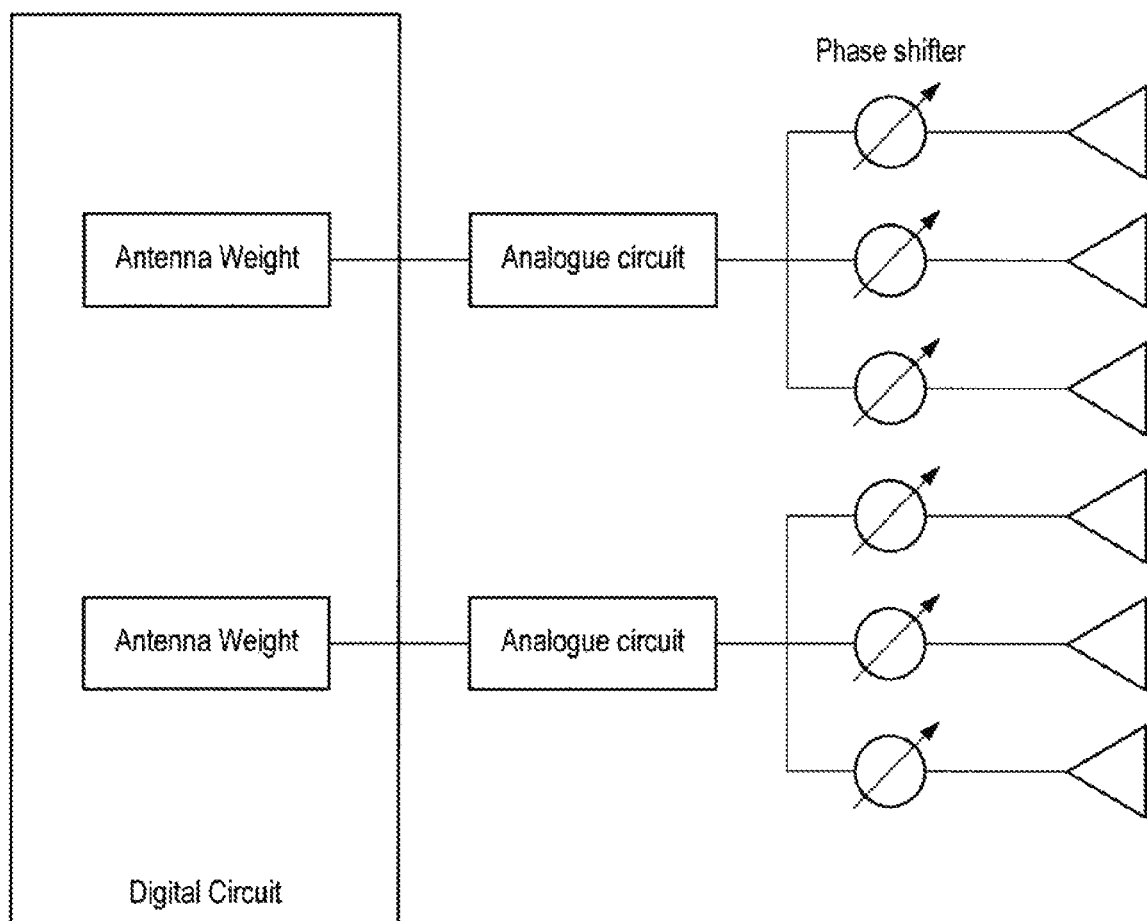
FIG. 2 is an example of the base station in a case where phase shifters of analog units are included in beamforming.

FIG. 2 is an example of the base station in a case where phase shifters of analog units are included in beamforming. The configuration in which phase shifters of analog units are included in beamforming is called "digital-analog hybrid antenna architecture." The digital-analog hybrid antenna architecture in FIG. 2 includes the smaller number of digital units, each of which is hardware, and is thus advantageous in terms of cost. In the hybrid antenna architecture, however, the phase shifter connected to an antenna can only emit a beam in one direction, with the result that as many resources as the number of beams are required in transmission sweeping and reception sweeping. This means that, in order to perform reception sweeping by the base station, a terminal is required to transmit UL RSs to all resources corresponding to the number of beams. The terminal consequently consumes a large amount of electric power.

In light of the actual usage situation, it is assumed that the hybrid architecture illustrated in FIG. 2 is used. How to overcome a flaw of the hybrid architecture that different beams require different frequency or time resources is therefore important.

(Beam Sweeping Efficiency)

Figure 3:
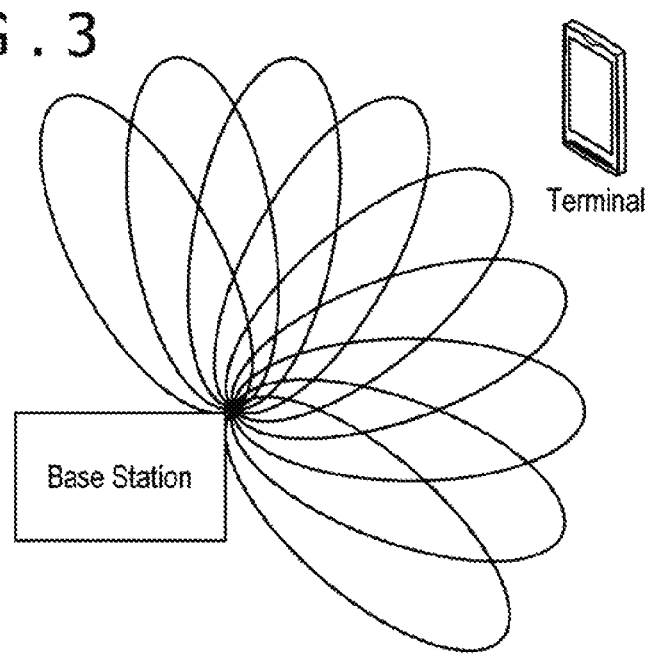
FIG. 3 is an explanatory diagram illustrating an example of beam sweeping using rough beams.
Figure 4:
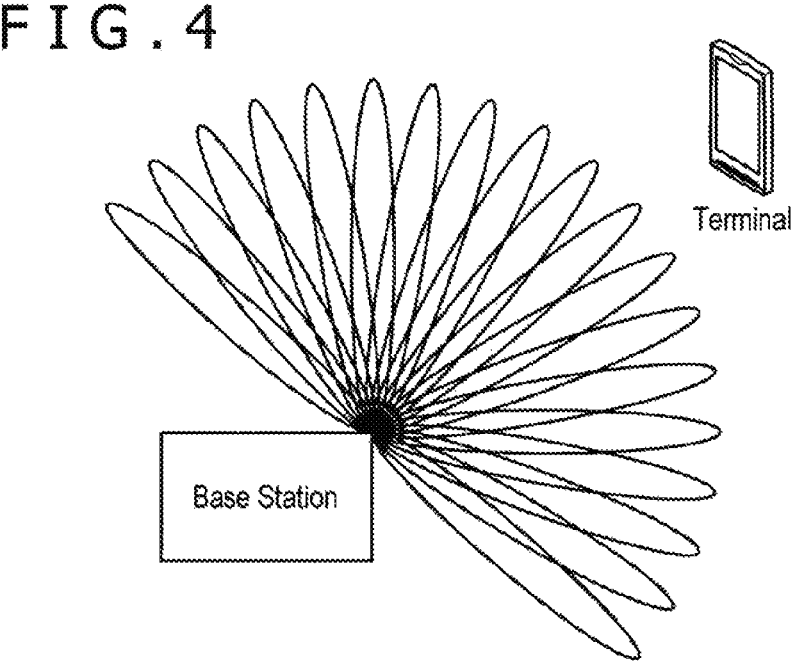
FIG. 4 is an explanatory diagram illustrating an example of beam sweeping using accurate beams.
Figure 5:
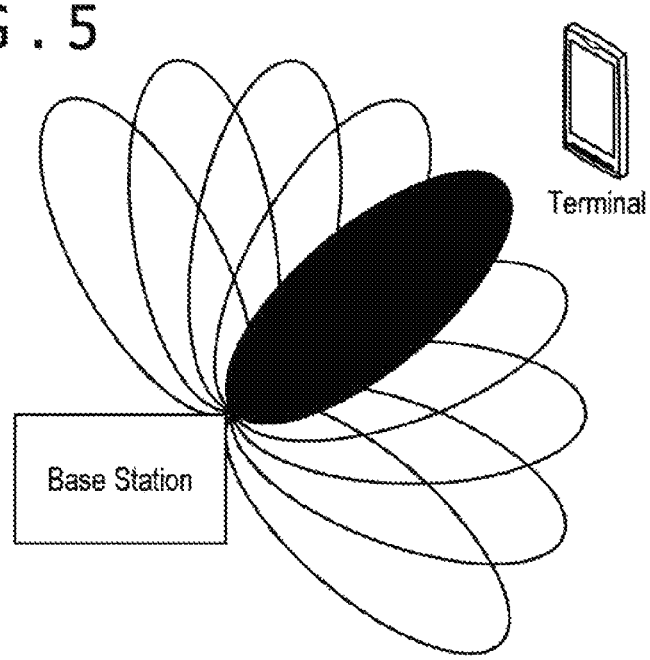
FIG. 5 is an explanatory diagram illustrating an example of a rough beam.
Figure 6:
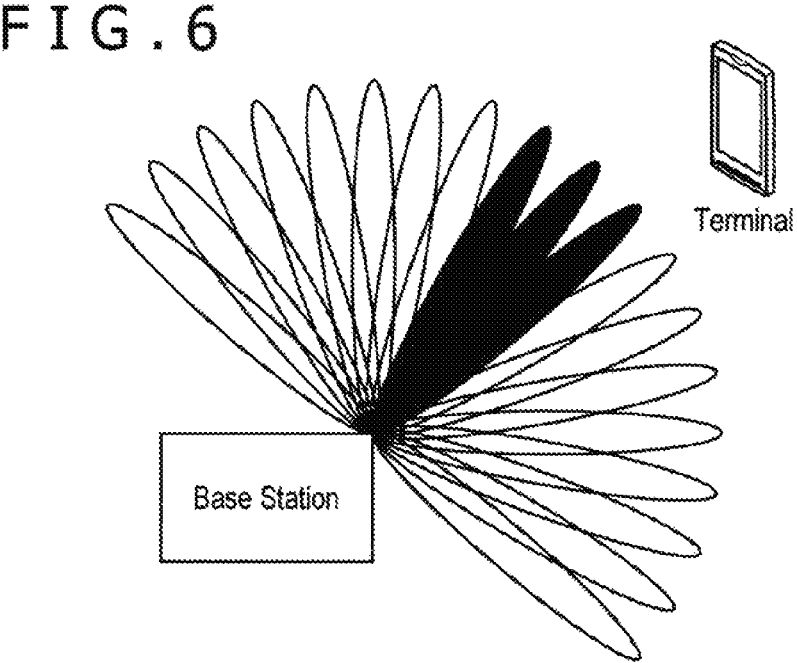
FIG. 6 is an explanatory diagram illustrating an example of rough beam generation including bundling accurate beams.

If beams at every degree from 0° to 360° in the horizontal direction are prepared and beam sweeping is performed with the use of 360 resources to evaluate the beam one by one, the processing takes long time, the number of required resources is large, and a terminal consumes a large amount of electric power. The following technology is accordingly conceivable: a base station creates rough beams at every 10°, finds an optimal beam from the beams having a resolution of 10° by using 36 resources, and thereafter performs beam sweeping using accurate beams at every degree in the range of 10°, to thereby find an optimal beam. In this case, the base station can determine an optimal beam by using 36+10=46 resources, and hence the number of resources can be greatly reduced from 360 to 46. FIG. 3 is an explanatory diagram illustrating an example of beam sweeping using rough beams. Further, FIG. 4 is an explanatory diagram illustrating an example of beam sweeping using accurate beams. The base station may bundle plural accurate beams to use the accurate beams simultaneously, thereby treating the accurate beams as a rough beam. In that case, for example, plural (for example, three) adjacent accurate beams are simultaneously used as a rough beam. The base station may provide a bundle of three accurate beams as illustrated in FIG. 6 to create a rough beam illustrated in FIG. 5. The three beams in FIG. 6 that are transmitted at the same time and the same frequency can achieve a rough beam similar to the one in FIG. 5.

(Beam Sweeping from Plural Base Stations)

Figure 7:
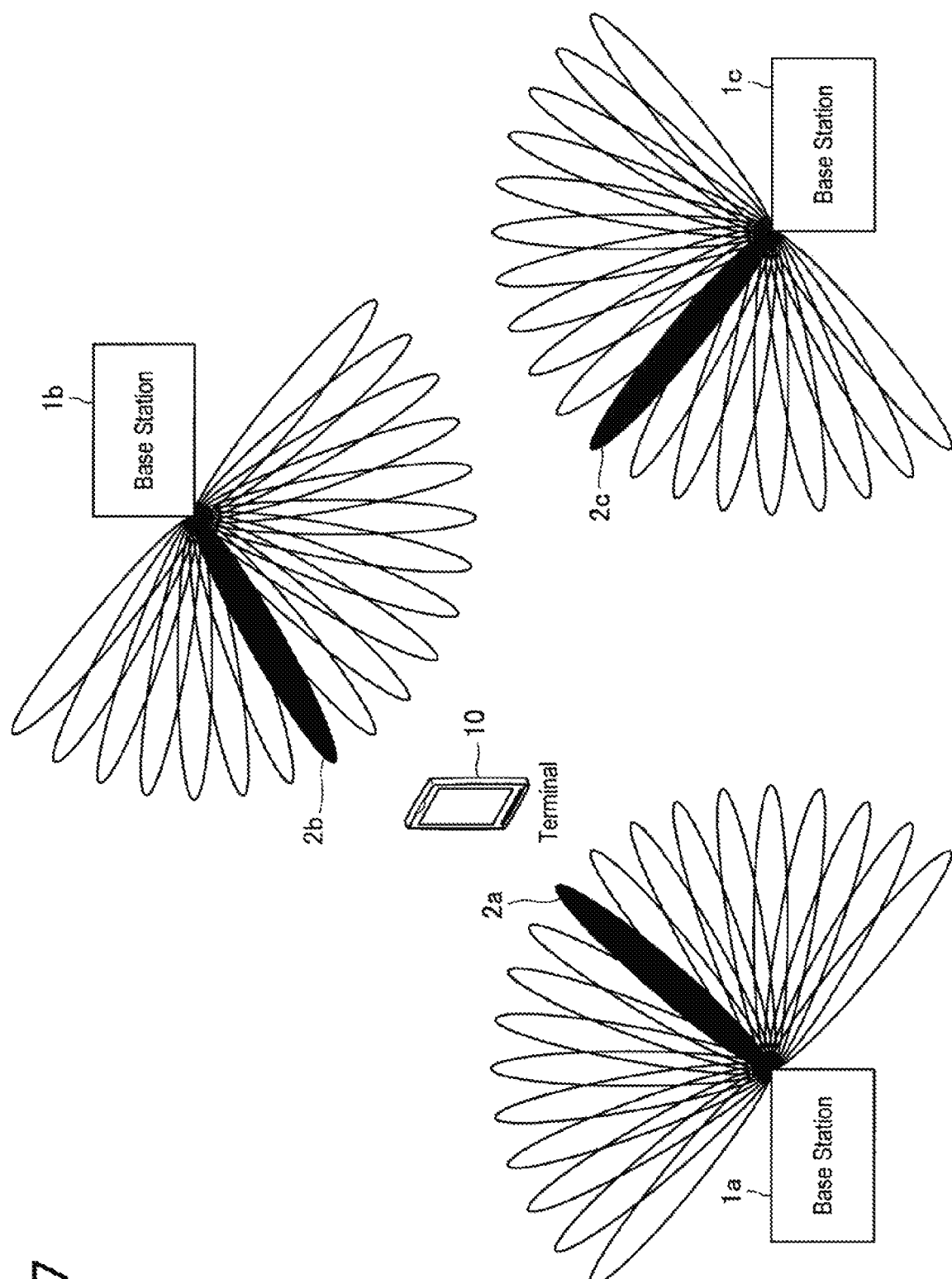
FIG. 7 is an explanatory diagram illustrating an example of a case where there are a plurality of base stations around a terminal.

In a case where there are plural base stations around a terminal, it is necessary to determine transmission beams and reception beams of the plural base stations for the terminal. FIG. 7 is an explanatory diagram illustrating an example of a case where there are plural base stations around a terminal. In the example illustrated in FIG. 7, an optimal beam for a terminal 10 is a beam 2a of a base station 1a, a beam 2b of a base station 1b, and a beam 2c of a base station 1c. As a method of determining an optimal beam, the following method is conceivable: of the plural base stations 1a to 1c, a base station closest to the terminal 10 or a main base station eventually determines an optimal beam on the basis of information from the terminal 10, and instructs other base stations. In this case, a certain base station is required to determine transmission beams and reception beams of plural base stations, and hence a burden on the terminal increases.

(Channel Reciprocity)

"Channel reciprocity" means that a UL channel and a DL channel between a base station and a terminal are the same. In TDD (Time Division Duplex) systems, since the same frequency band is used for ULs and DLs, channel reciprocity of ULs and DLs is basically held. It is, however, necessary to perform the operation of calibration to make the base station and analog units of the terminal have the same TX/RX characteristics so that reciprocity is held in both channels to the analog units of the terminal and space.

With this channel reciprocity held, when the terminal selects a DL beam from the base station and notifies the number of the beam to the base station, a UL beam that the base station is to use can be determined without the operation of reception sweeping. A combination of rough beams and accurate beams, which is described in the (Beam Sweeping Efficiency) section above, is made as follows.

(DL Beam Sweeping Process)

Figure 8:
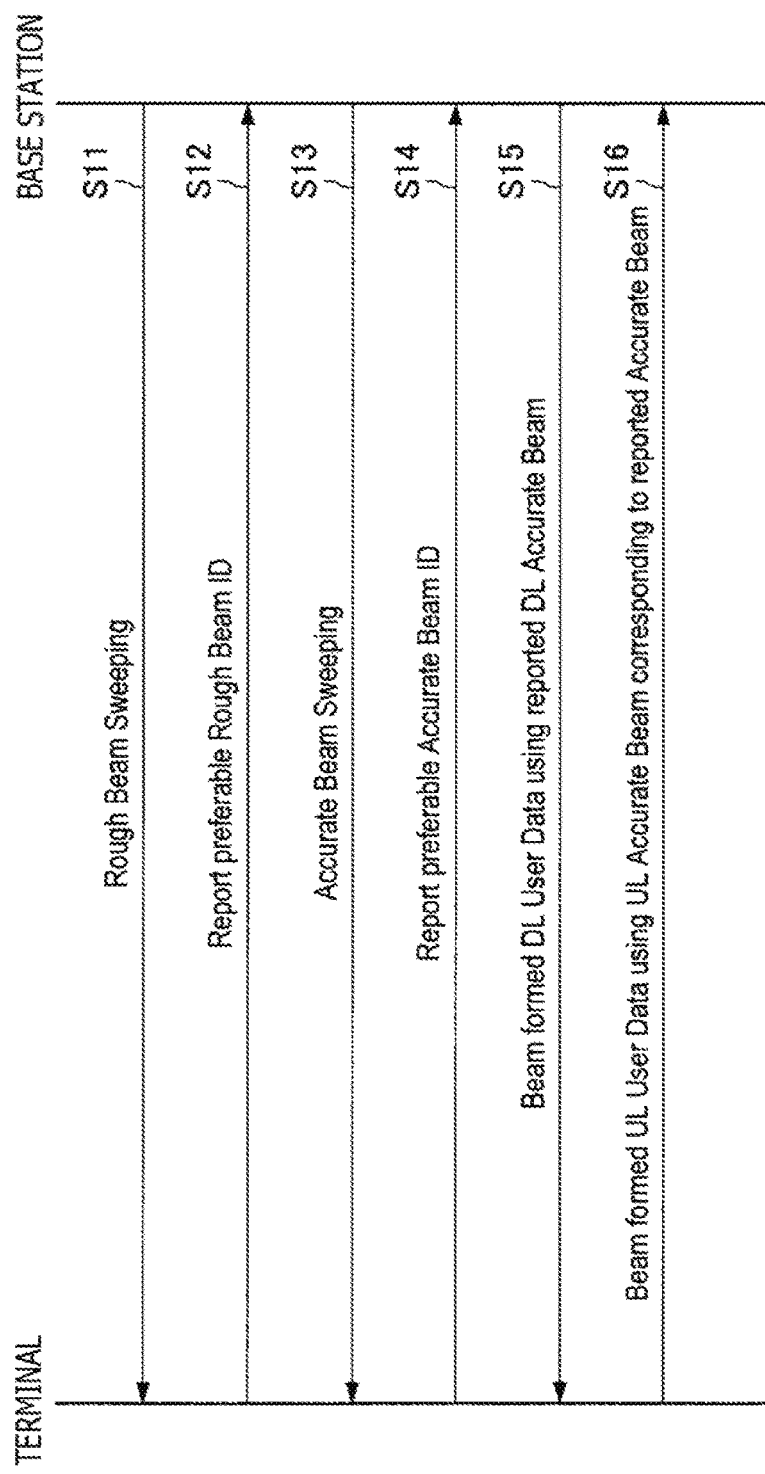
FIG. 8 is an explanatory diagram illustrating an example of a DL beam sweeping process by the base station and the terminal.

FIG. 8 is an explanatory diagram illustrating an example of a DL beam sweeping process by the base station and the terminal. First, the base station performs transmission sweeping using a rough beam on the terminal (Step S11). This transmission sweeping is performed with a sweeping pattern unique to the base station. In other words, transmission sweeping is base station-specific or cell specific.

The terminal reports the number of a rough beam desired for the terminal in question to the base station (Step S12). The terminal determines the desired rough beam on the basis of whether a beam has the largest reception electric power, for example.

When receiving the report of the number of the rough beam from the terminal, the base station performs transmission sweeping using accurate beams corresponding to the rough beam (Step S13). Transmission sweeping at this time may employ a sweeping pattern unique to the terminal, which has been specially prepared for the terminal. Alternatively, a sweeping pattern common to all terminals may be prepared, and the base station may notify each terminal of a portion to monitor. In the former case, the transmission sweeping pattern itself is unique to the terminal (UE specific). In the latter case, it may be said that the settings of the transmission sweeping pattern are unique to the terminal (UE specific).

The terminal reports the number of an accurate beam desired for the terminal in question to the base station (Step S14). The terminal determines the desired accurate beam on the basis of whether a beam has the largest reception electric power, for example.

When receiving the report of the number of the accurate beam from the terminal, the base station transmits DL user data to the terminal by using the accurate beam (Step S15). Then, in a case where channel reciprocity is supposed to be held, the base station uses the same accurate beam as the accurate beam for transmission to receive UL user data from the terminal (Step S16).

(CQI (Channel Quality Information) Acquisition)

When the beam sweeping process described above has been complete, an optimal transmission beam of the base station that is used between the base station and the terminal can be determined. DL CQI acquisition is grasping a channel quality and an interference status when the determined transmission beam is used. DL CQI acquisition is required for the terminal to notify, by using a feedback using a UL, which is called "CQI (Channel Quality Indicator) feedback," the base station of a modulation method and a coding rate that the terminal wants the base station to use in DL data transmission. This feedback is performed as follows: the base station transmits a DL reference signal to the terminal for DL CQI acquisition, and the terminal receives the DL reference signal for DL CQI acquisition to evaluate a channel status. With this, the terminal can determine a desired CQI (combination of modulation method and coding rate).

As described above, it is necessary that the base station first determine a desired transmission beam in the beam sweeping process, and the terminal determine a CQI in the CQI acquisition procedure and notify the CQI to the base station as a CQI feedback.

When a base station configured to execute the beam sweeping process as described above does not have a particular target terminal and uniformly provides rough beams in all directions, the base station wastes resources. It is accordingly necessary to achieve a further reduction in resource.

In view of the points described above, the discloser of the subject application has made an intensive study on a technology that can further reduce resources that are used in executing the beam sweeping process. As a result, the discloser of the subject application has devised the technology that can further reduce resources that are used in executing the beam sweeping process, which is described later.

1.2. Configuration Example and Operation Example

Figure 9:
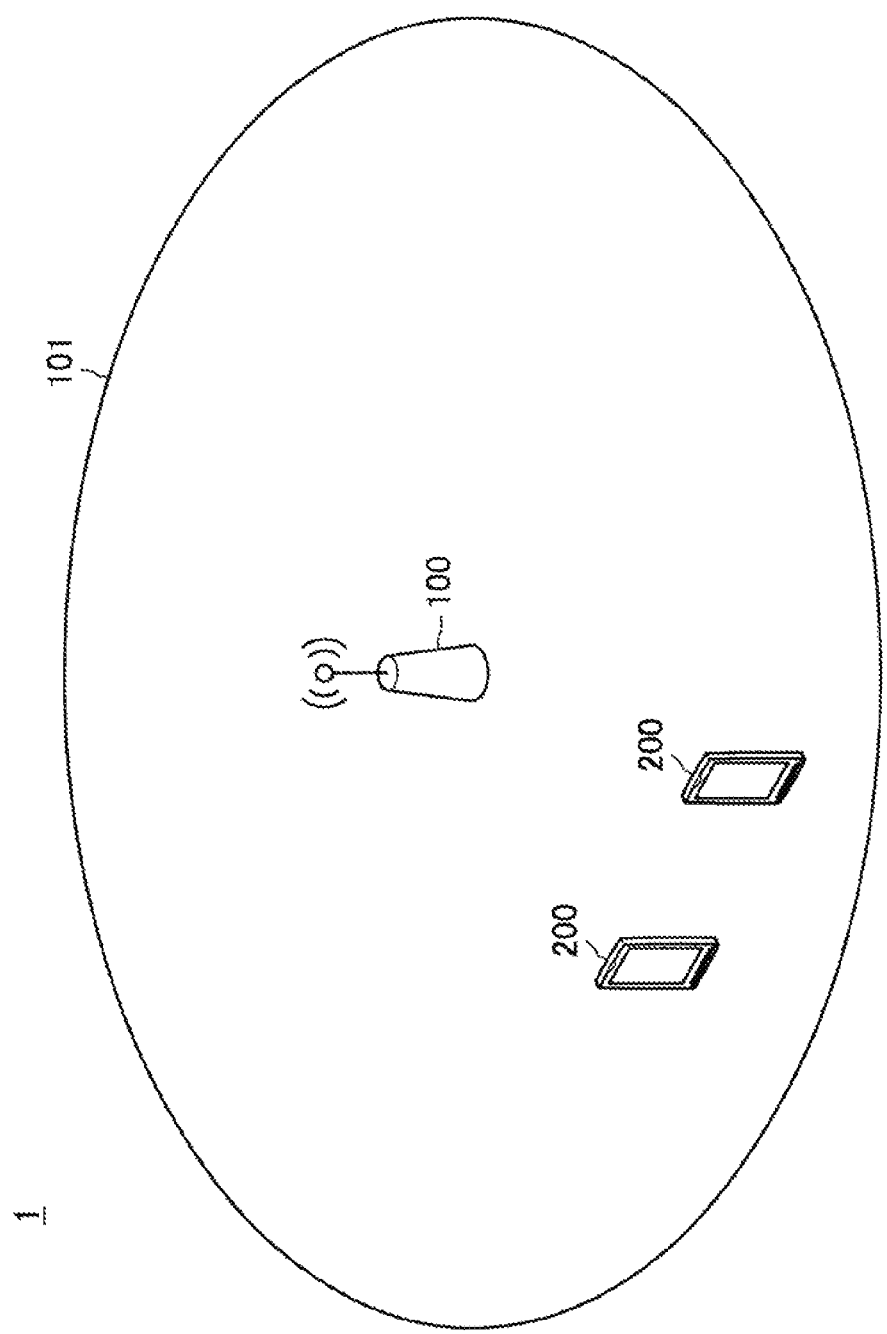
FIG. 9 is an explanatory diagram illustrating an example of the schematic configuration of a system according to an embodiment of the present disclosure.

First, with reference to the drawings, the schematic configuration of a system according to the embodiment of the present disclosure is described. FIG. 9 is an explanatory diagram illustrating an example of the schematic configuration of the system according to the embodiment of the present disclosure. With reference to FIG. 9, the system according to the embodiment of the present disclosure includes a base station 100 and a terminal apparatus 200. A system 1 is a system conforming to LTE, LTE-Advanced, or the fifth-generation mobile communication system (5G), or a communication standard equivalent thereto, for example.

(Base Station 100)

The base station 100 performs wireless communication with the terminal apparatus 200. For example, the base station 100 performs wireless communication with the terminal apparatus 200 positioned in a cell 101 of the base station 100.

In the embodiment of the present disclosure, in particular, the base station 100 performs beamforming. For example, the beamforming in question is large-scale MIMO beamforming. The beamforming in question may also be called "massive MIMO beamforming," "free dimension MIMO beamforming," or "three-dimensional beamforming." Specifically, for example, the base station 100 includes a directional antenna usable in large-scale MIMO, and multiplies a weight set for the directional antenna in question to a transmission signal, to thereby perform large-scale MIMO beamforming.

(Terminal Apparatus 200)

The terminal apparatus 200 performs wireless communication with the base station 100. For example, the terminal apparatus 200 performs wireless communication with the base station 100 in a case of being positioned in the cell 101 of the base station 100.

Subsequently, with reference to FIG. 10 and FIG. 11, examples of the configurations of the base station 100 and the terminal apparatus 200 are described.

Figure 10:
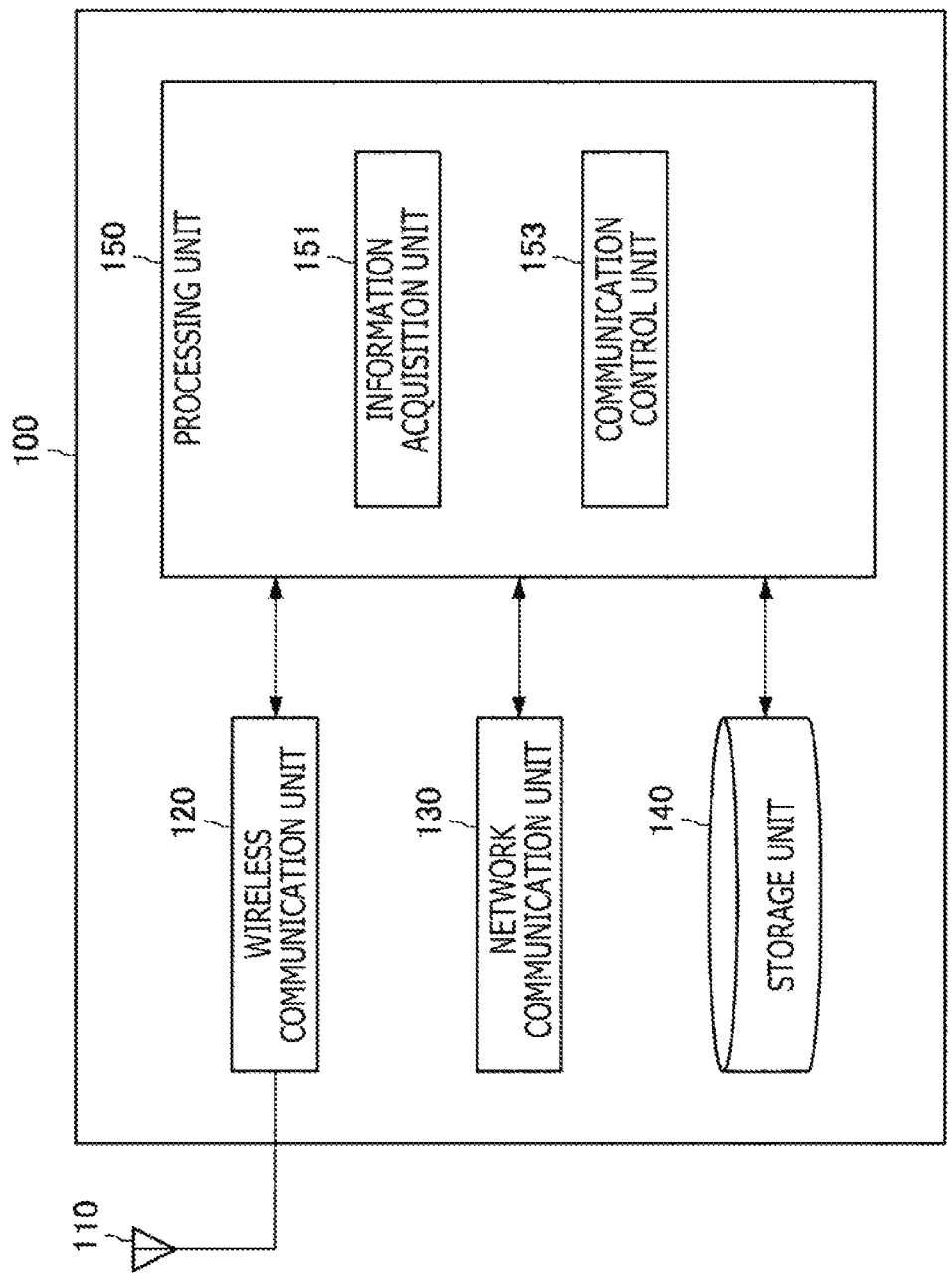
FIG. 10 is an explanatory diagram illustrating an example of the configuration of a base station 100 according to the embodiment.

First, with reference to FIG. 10, the example of the configuration of the base station 100 according to the embodiment of the present disclosure is described. FIG. 10 is a block diagram illustrating the example of the configuration of the base station 100 according to the embodiment of the present disclosure. With reference to FIG. 10, the base station 100 includes an antenna unit 110, a wireless communication unit 120, a network communication unit 130, a storage unit 140, and a processing unit 150.

(Antenna Unit 110)

The antenna unit 110 emits, to space, signals output by the wireless communication unit 120 as radio waves. Further, the antenna unit 110 converts radio waves in space to signals, and outputs the signals in question to the wireless communication unit 120.

For example, the antenna unit 110 includes a directional antenna. For example, the directional antenna in question is a directional antenna usable in large-scale MIMO.

(Wireless Communication Unit 120)

The wireless communication unit 120 transmits and receives signals. For example, the wireless communication unit 120 transmits downlink signals to the terminal apparatus 200, and receives uplink signals from the terminal apparatus 200.

(Network Communication Unit 130)

The network communication unit 130 transmits and receives information. For example, the network communication unit 130 transmits information to another node and receives information from the another node. Examples of the another node in question include another base station and a core network node.

(Storage Unit 140)

The storage unit 140 stores data and programs for operation of the base station 100.

(Processing Unit 150)

The processing unit 150 provides various functions of the base station 100. The processing unit 150 includes an information acquisition unit 151 and a control unit 153. Note that the processing unit 150 may further include components other than these components. That is, the processing unit 150 may perform operation other than operation of these components.

How the information acquisition unit 151 and the control unit 153 specifically operate is described in detail below.

Specifically, the information acquisition unit 151 acquires information transmitted from the terminal apparatus 200, in particular, information regarding the reception status of beams transmitted by the base station 100.

Further, the control unit 153 performs control on transmission of beams from the base station 100 and the settings of beam sweeping, for example.

Figure 11:
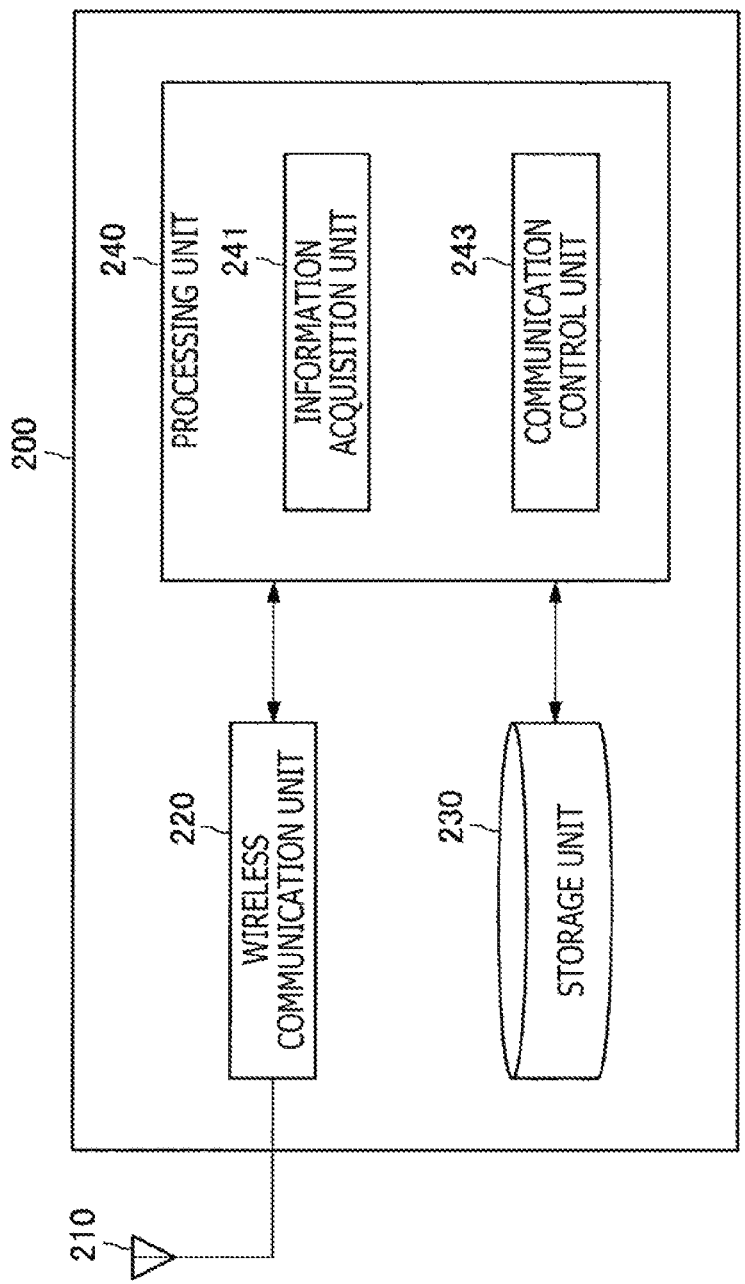
FIG. 11 is an explanatory diagram illustrating an example of the configuration of a terminal apparatus 200 according to the embodiment.

Next, with reference to reference FIG. 11, the example of the configuration of the terminal apparatus 200 according to the embodiment of the present disclosure is described. FIG. 11 is a block diagram illustrating the example of the configuration of the terminal apparatus 200 according to the embodiment of the present disclosure. With reference to FIG. 11, the terminal apparatus 200 includes an antenna unit 210, a wireless communication unit 220, a storage unit 230, and a processing unit 240.

(Antenna Unit 210)

The antenna unit 210 emits, to space, signals output by the wireless communication unit 220 as radio waves. Further, the antenna unit 210 converts radio waves in space to signals, and outputs the signals in question to the wireless communication unit 220.

(Wireless Communication Unit 220)

The wireless communication unit 220 transmits and receives signals. For example, the wireless communication unit 220 receives downlink signals from the base station 100, and transmits uplink signals to the base station 100.

(Storage Unit 230)

The storage unit 230 stores data and programs for operation of the terminal apparatus 200.

(Processing Unit 240)

The processing unit 240 provides various functions of the terminal apparatus 200. The processing unit 240 includes an information acquisition unit 241 and a control unit 243. Note that the processing unit 240 may further include components other than these components. That is, the processing unit 240 may perform operation other than operation of these components.

How the information acquisition unit 241 and the control unit 243 specifically operate is described in detail below.

Subsequently, how the base station 100 specifically operates is described. When executing the beam sweeping process, the base station 100 according to the embodiment of the present disclosure forms groups each including a plurality of beams, and executes beam sweeping for each group. The numbers of beams of the groups may be different from each other. Further, the base station 100 may form beam groups with beams provided by a plurality of antenna panels.

Figure 12:
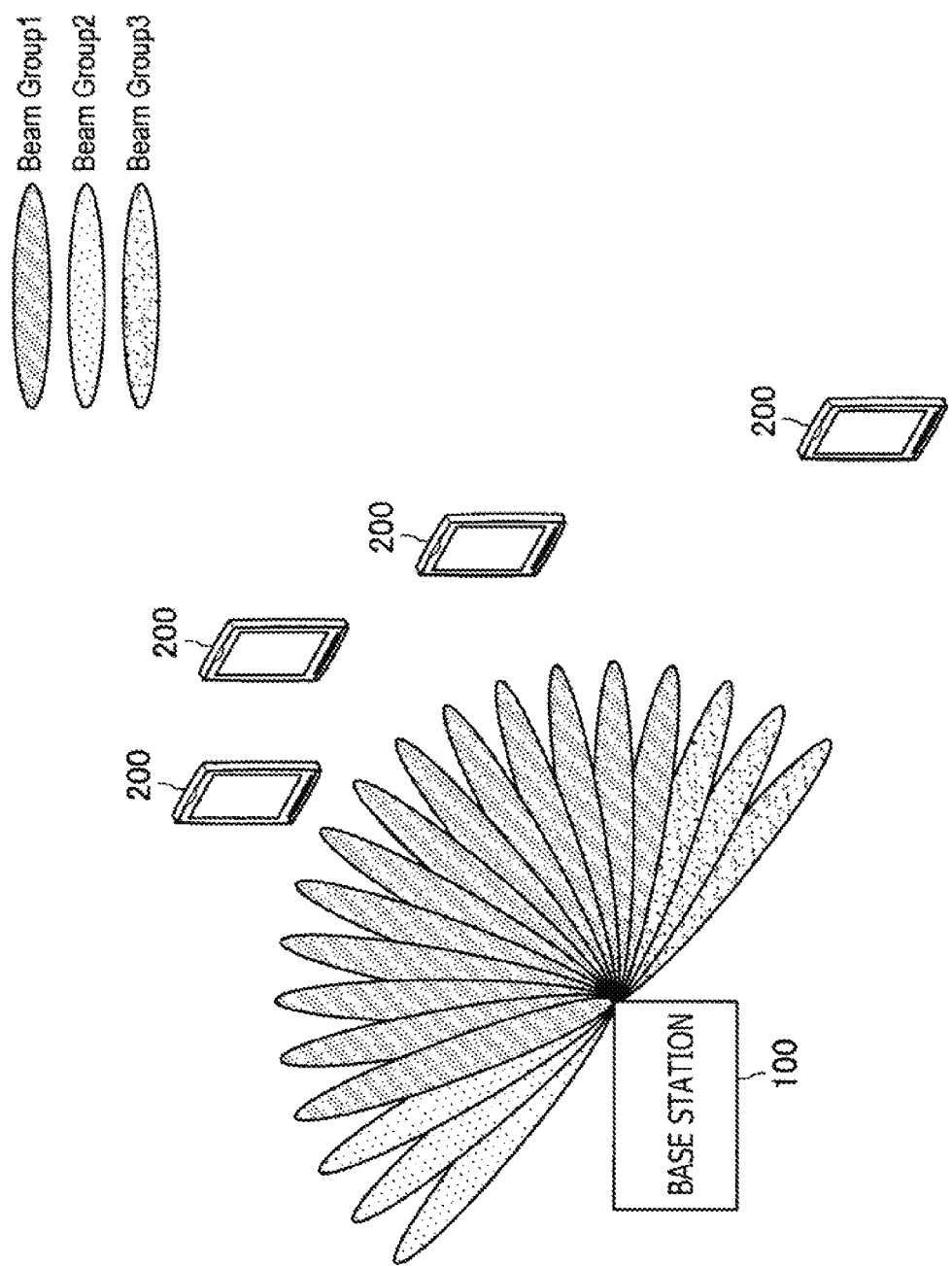
FIG. 12 is an explanatory diagram illustrating the base station 100 forming groups each including a plurality of beams.

FIG. 12 is an explanatory diagram illustrating the base station 100 forming groups each including a plurality of beams. FIG. 12 illustrates three Beam Groups 1, 2, and 3. In the example illustrated in FIG. 12, Beam Group 1 includes 13 beams, and Beam Groups 2 and 3 each include three beams. As a matter of course, the number of beams of the beam group is not limited to the example.

Figure 13:
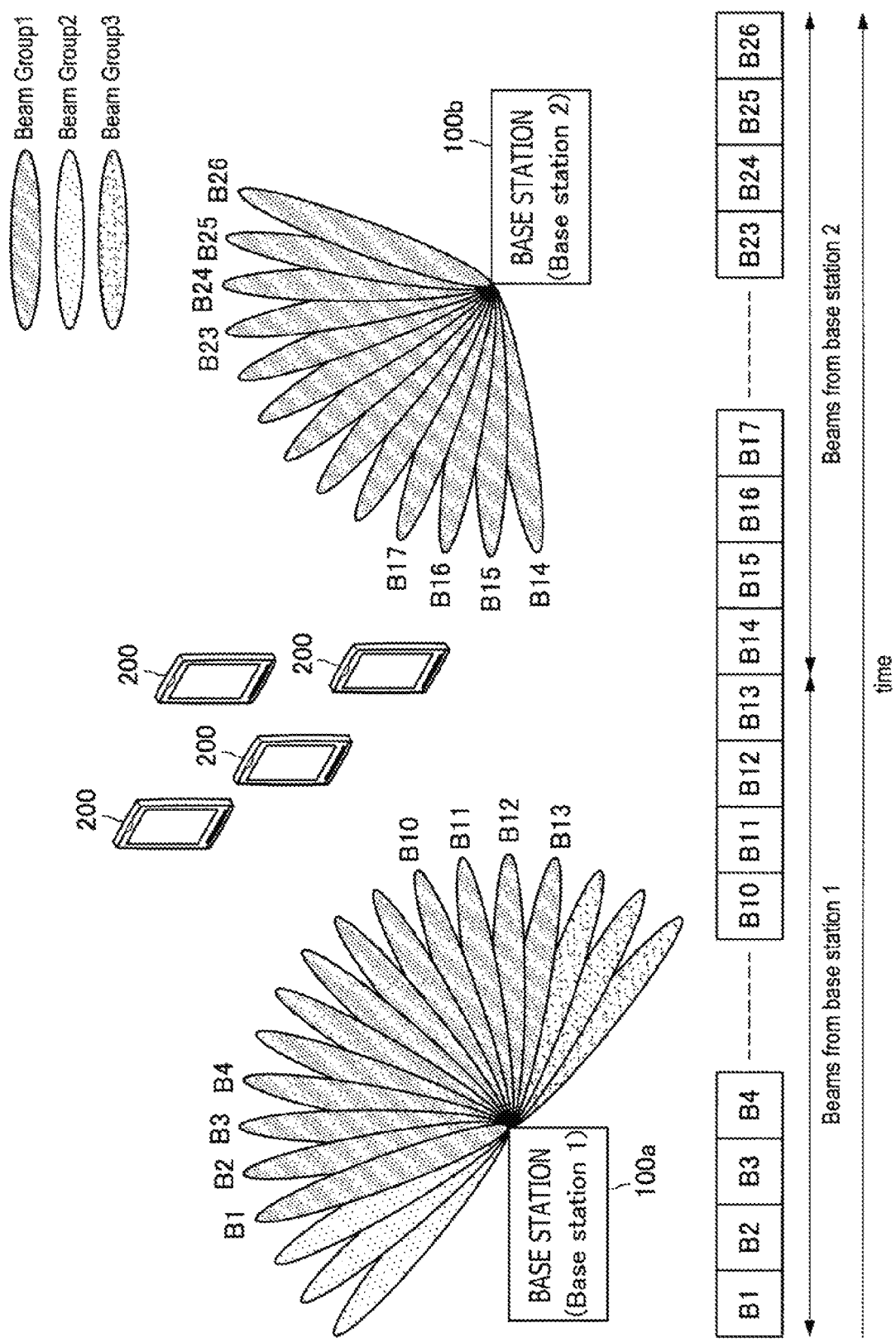
FIG. 13 is an explanatory diagram illustrating base stations 100a and 100b forming groups each including a plurality of beams.

When forming a group including a plurality of beams, the base station 100 may form a group including beams provided by a plurality of the base stations 100. FIG. 13 is an explanatory diagram illustrating base stations 100a and 100b forming groups each including a plurality of beams. FIG. 13 illustrates three Beam Groups 1, 2, and 3. In the example illustrated in FIG. 13, Beam Group 1 includes 13 beams from the base station 100a and 13 beams from the base station 100b, and Beam Groups 2 and 3 each include three beams from the base station 100a. As a matter of course, the number of beams of the beam group is not limited to the example.

The base station 100 performs beam sweeping in the unit of each beam group. The base station 100 changes the settings of beam sweeping, for example, the number of beams or the frequency of beam sweeping, between the beam groups. The base station 100 provides, for each beam group, a resource location thereof. The base station 100 provides the resource location with, for example, system information that is a broadcast signal or a dedicated signal for each terminal. When changing the settings of beam sweeping between the beam groups, the base station 100 may change the settings of beam sweeping depending on the status of an area that the beam group covers, for example, the number of the terminal apparatuses 200. For example, when there are a lot of terminal apparatuses 200, the base station 100 may change the settings of beam sweeping so that beam sweeping with a beam group covering the area is performed frequently.

In the example illustrated in FIG. 12, there are a lot of terminal apparatuses 200 in an area that the beams of Beam Group 1 cover. Meanwhile, there is only one terminal apparatus 200 in an area that the beams of Beam Group 1 cover, and there is no terminal apparatus 200 in an area that the beams of Beam Group 3 cover. Thus, the base station 100 sets, with respect to Beam Group 1, a time between the end of beam sweeping and the start of next beam sweeping that is shorter than those of the remaining beam groups. In contrast to this, the base station 100 sets, with respect to Beam Group 3 having no terminal apparatus 200, a time between the end of beam sweeping and the start of next beam sweeping that is longer than those of the remaining beam groups.

Figure 14:
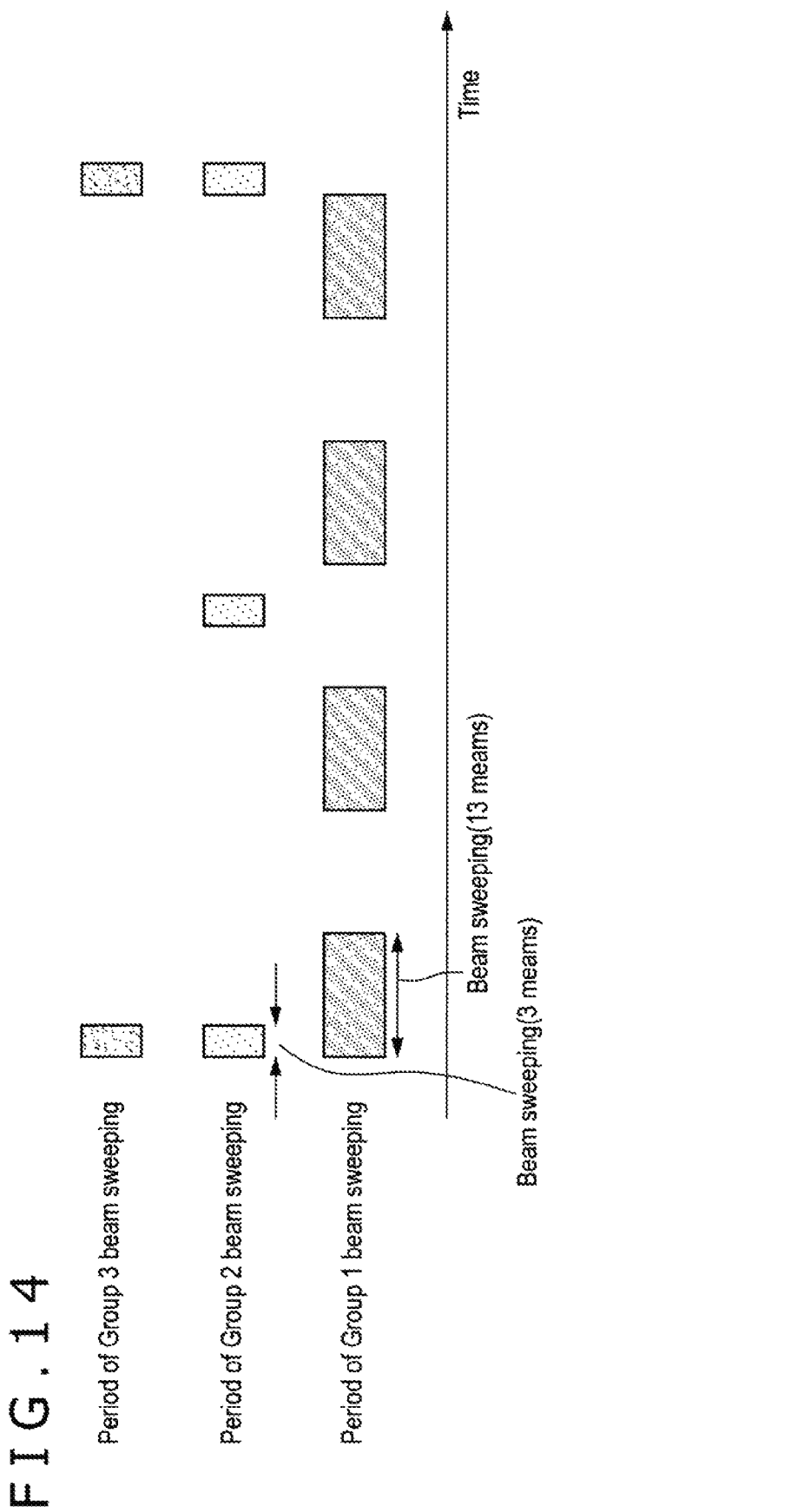
FIG. 14 is an explanatory diagram illustrating an example of timing of beam sweeping by the base station 100.

FIG. 14 is an explanatory diagram illustrating an example of timing of beam sweeping by the base station 100. FIG. 14 illustrates an example of timing of beam sweeping with Beam Groups 1, 2, and 3 illustrated in FIG. 12. The base station 100 sets, with respect to Beam Group 1, a time between the end of beam sweeping and the start of next beam sweeping that is shorter than those of the remaining beam groups, as illustrated in FIG. 14. Further, the base station 100 sets, with respect to Beam Group 3, a time between the end of beam sweeping and the start of next beam sweeping that is longer than those of the remaining beam groups, as illustrated in FIG. 14.

Figure 15:
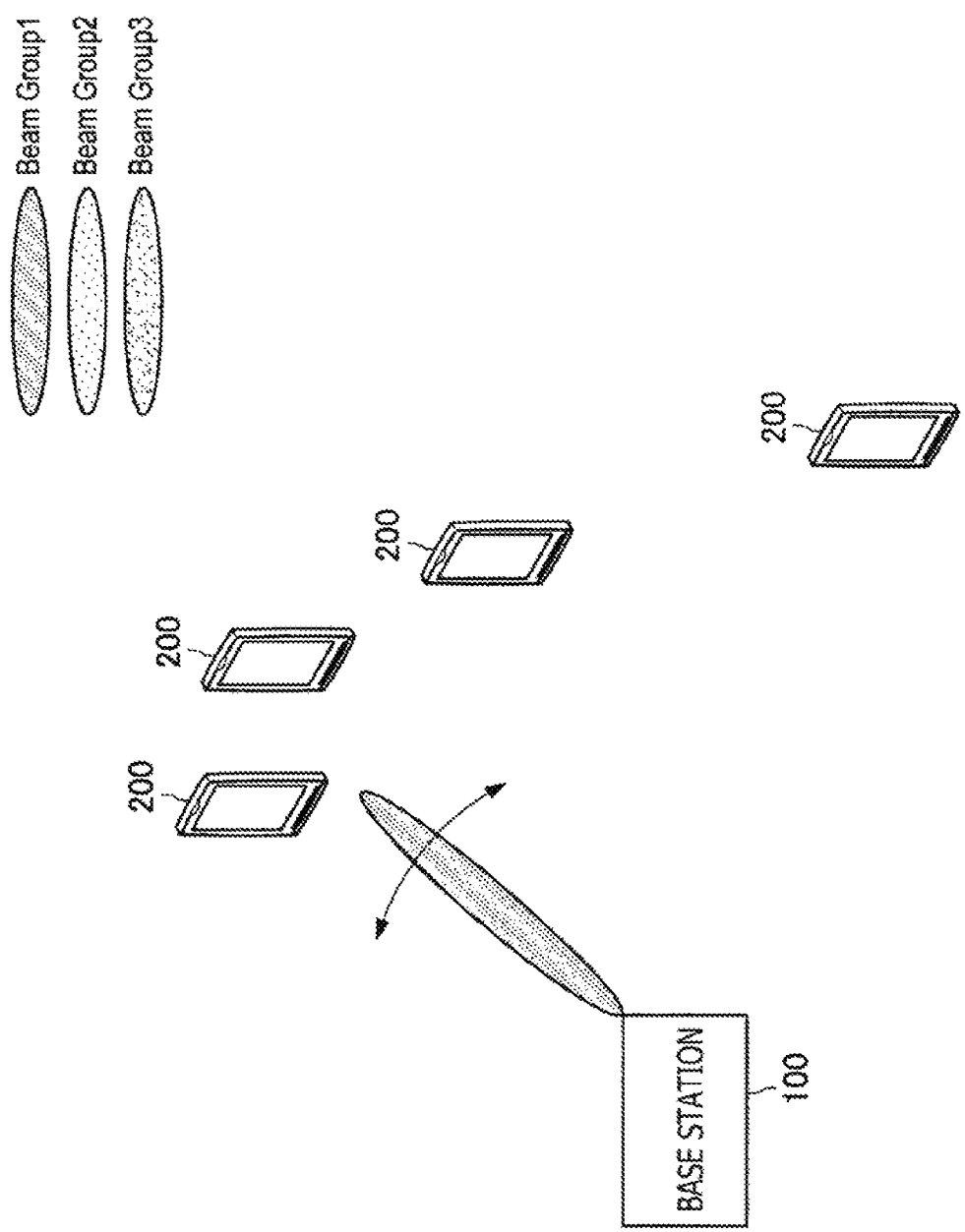
FIG. 15 is an explanatory diagram illustrating beam sweeping by the base station 100.
Figure 16:
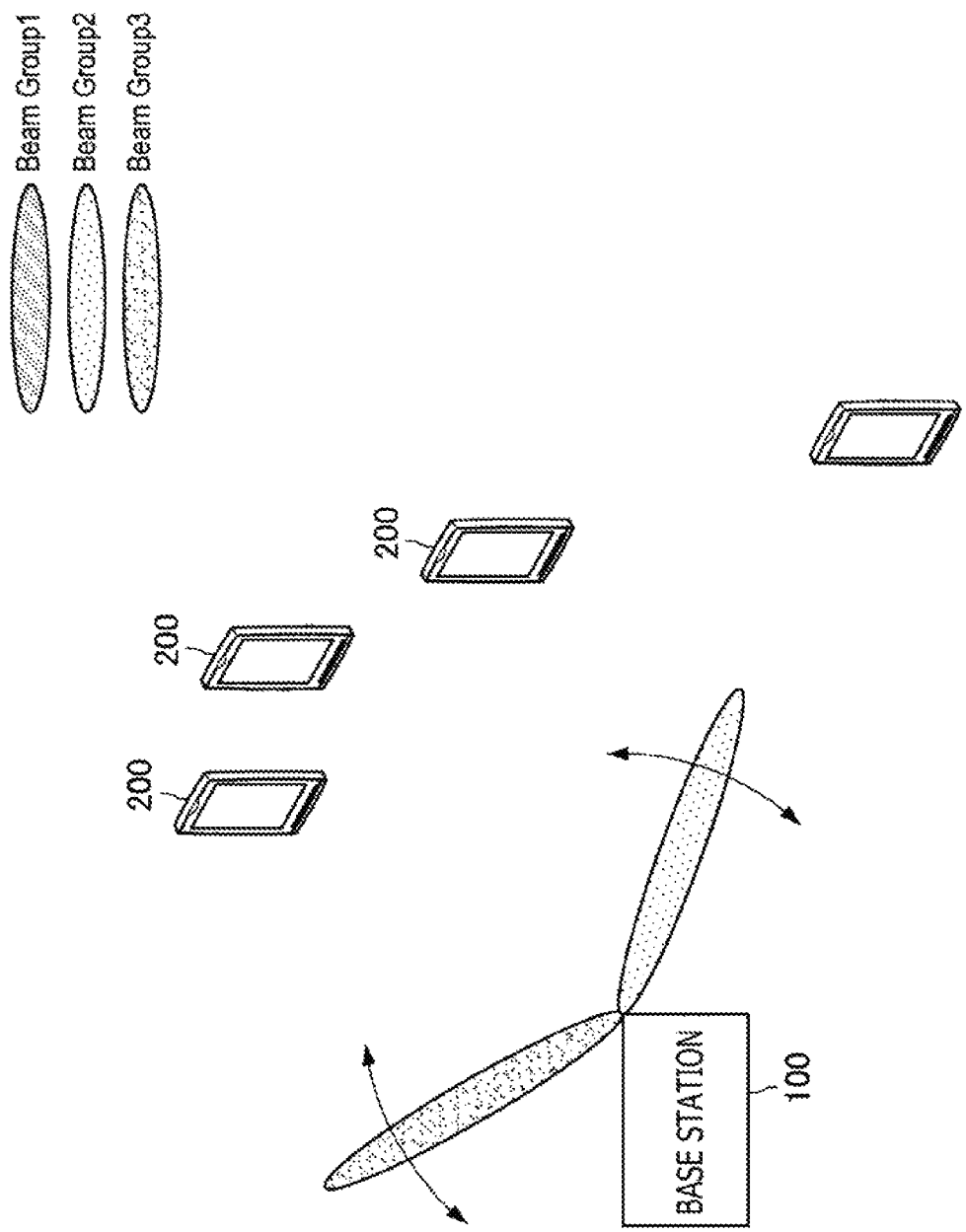
FIG. 16 is an explanatory diagram illustrating beam sweeping by the base station 100.

In a case where beam sweeping is performed with Beam Group 1, for example, with the use of different time or frequency resources, the base station 100 transmits 13 beams by using the respective resources at 13 beam transmission timings. FIG. 15 is an explanatory diagram illustrating beam sweeping with Beam Group 1 by the base station 100. That is, the base station 100 does not simultaneously provide data with the 13 beams, but performs beam sweeping like a lighthouse. Meanwhile, the beams belonging to Beam Groups 2 and 3 travel in greatly different directions from Beam Group 1 with respect to the base station 100, and hence even when the beams belonging to Beam Groups 2 and 3 are transmitted with the use of completely the same time or frequency as Beam Group 1, the terminal apparatus 200 does not observes interference. A terminal that can observe the beams belonging to Beam Group 2 cannot observe the beams belonging to Beam Group 3 at all or can hardly observe the beams in question. FIG. 16 is an explanatory diagram illustrating beam sweeping with Beam Groups 2 and 3 by the base station 100. In this case, electric power provided to the beams belonging to Beam Group 2 and the beams belonging to Beam Group 3 is half of electric power provided to the beams belonging to Beam Group 1. The base station 100 notifies the terminal apparatus 200 of the value of electric power for each beam group in advance. When the base station 100 notifies the terminal apparatus 200 of the value of electric power for each beam group in advance, the base station 100 can fairly evaluate the beam quality of the beam groups, namely, Beam Groups 1, 2, and 3. Even when the base station 100 has grasped a difference in electric power between the groups, since the terminal apparatus 200 selects a limited preferable beam and reports information associated with the preferable beam to the base station 100, the terminal apparatus 200 is required to grasp the difference in transmission electric power between the beam groups. In addition, when such a difference in electric power is notified for each beam, the amount of information to be notified is large. Thus, it is very important that the base station 100 notifies the difference in electric power for each beam group. This is because the number of beams is quite large.

The base station 100 adjusts an interval between the end of beam sweeping and the start of next beam sweeping with respect not only to beam sweeping using rough beams, but also to beam sweeping using accurate beams depending on the number of the terminal apparatuses 200.

Table 1 is an example of information associated with the beam groups of which the terminal apparatus 200 is notified by the base station 100. With such information of which the terminal apparatus 200 is notified by the base station 100, the terminal apparatus 200 can appropriately evaluate the beams belonging to each beam group.

TABLE 1

| Items | Contents |
| --- | --- |
| A period in which all beam groups can be observed | A period (such as 100 ms or 50 ms) and an offset. The offset is indicated by an . (System Frame Number). |

TABLE 1-continued

| Items | Contents |
| --- | --- |
| Electric power | SFN is a number given to a synchronization period. This may be indicated by an index number corresponding to -50 dBm, for example. |

(Table 1: examples of information associated with a beam group)

Figure 17:
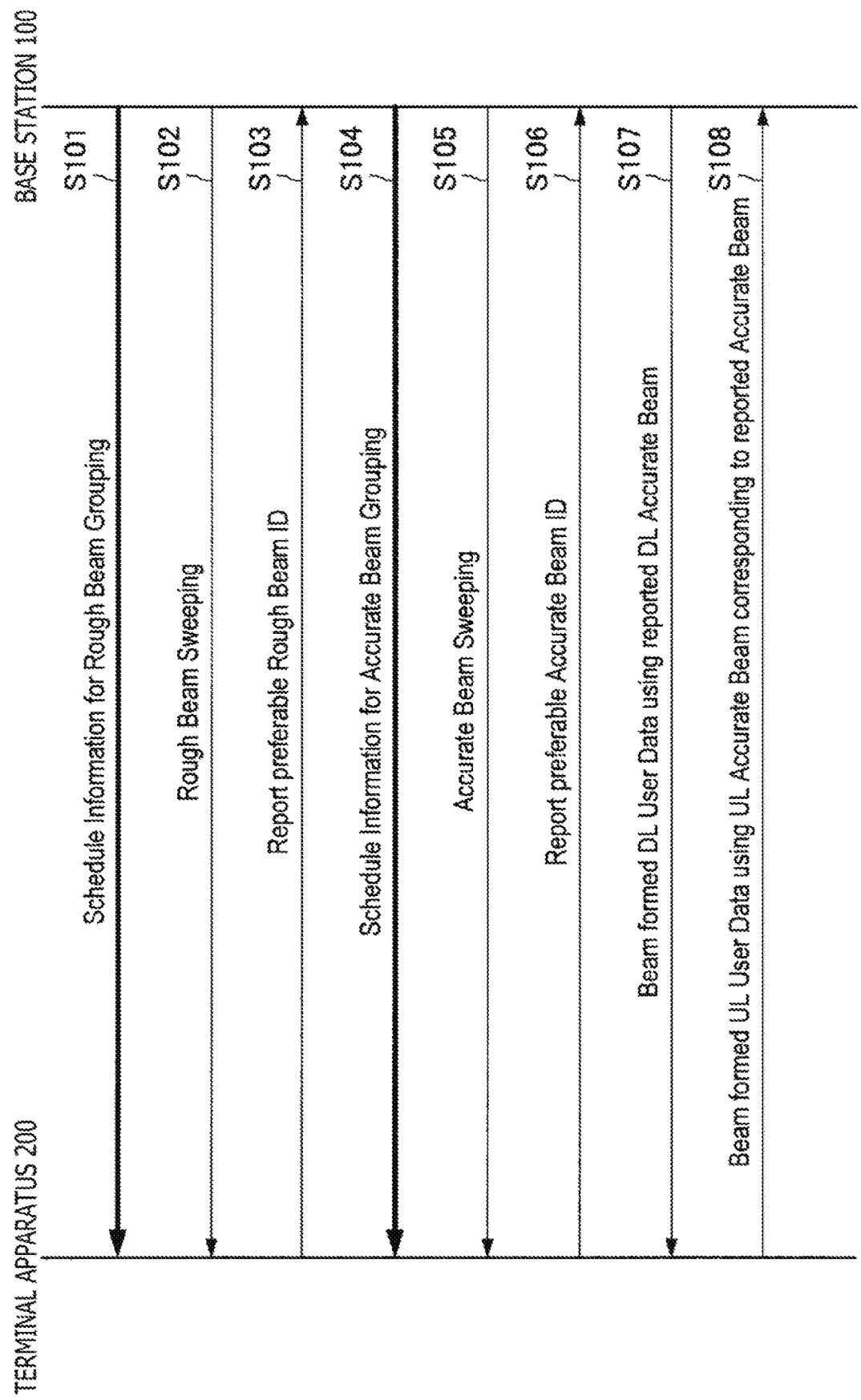
FIG. 17 is a flowchart illustrating operation examples of the base station 100 and the terminal apparatus 200 according to the embodiment.

FIG. 17 is a flowchart illustrating operation examples of the base station 100 and the terminal apparatus 200 according to the embodiment of the present disclosure. FIG. 17 illustrates operation examples when the terminal apparatus 200 determines an optimal beam from beams emitted by the base station 100, and transmission or reception of data is performed between the base station 100 and the terminal apparatus 200 by beamforming. Now, the operation examples of the base station 100 and the terminal apparatus 200 according to the embodiment of the present disclosure are described with reference to FIG. 17.

The base station 100 first transmits schedule information regarding a rough beam group to the terminal apparatus 200 (Step S101). This schedule information is information indicating a time or frequency resource location of beams belonging to the rough beam group.

Subsequently, the base station 100 performs transmission sweeping using the rough beams in a beam group unit on the terminal apparatus 200 on the basis of the schedule information regarding the rough beam group, which has been transmitted in Step S101 (Step S102). This transmission sweeping is performed with a sweeping pattern unique to the base station. In other words, the transmission sweeping is base station-specific or cell specific.

The terminal apparatus 200 reports the number of a rough beam desired for the terminal apparatus 200 to the base station 100 (Step S103). The terminal apparatus 200 determines the desired rough beam on the basis of whether or not a beam has the largest reception electric power, for example.

When receiving the report of the number of the rough beam from the terminal apparatus 200, the base station 100 transmits, to the terminal apparatus 200, schedule information regarding an accurate beam group corresponding to the rough beam (Step S104). This schedule information is information indicating a time or frequency resource location of beams belonging to the accurate beam group.

Subsequently, the base station 100 performs, on the terminal apparatus 200, transmission sweeping using the accurate beams in a beam group unit on the basis of the schedule information regarding the accurate beam group, which has been transmitted in Step S104 (Step S105). Transmission sweeping at this time may employ a sweeping pattern unique to the terminal, which has been specially prepared for the terminal. Alternatively, a sweeping pattern common to all terminals may be prepared, and the base station may notify each terminal of a portion to monitor. In the former case, the transmission sweeping pattern itself is unique to the terminal (UE specific). In the latter case, the settings of the transmission sweeping pattern are unique to the terminal (UE specific).

The terminal apparatus 200 reports the number of an accurate beam desired for the terminal apparatus 200 to the base station 100 (Step S106). The terminal apparatus 200 determines the desired accurate beam on the basis of whether or not a beam has the largest reception electric power, for example.

When receiving the report of the number of the accurate beam from the terminal apparatus 200, the base station 100 transmits DL user data to the terminal by using the accurate beam (Step S107). Then, in a case where channel reciprocity is supposed to be held, the base station 100 uses the same accurate beam as the accurate beam for transmission to receive data from the terminal, and thus receives UL user data from the terminal apparatus 200 (Step S108).

The base station 100 according to the embodiment of the present disclosure groups the beams and performs beam sweeping in a group unit in this way, thereby being capable of achieving beam sweeping efficiently using resources.

FIG. 13 illustrates the base stations 100a and 100b forming the groups each including the plurality of beams. That is, Beam Group 1 includes 26 beams in total from the base stations 100a and 100b. With beam grouping across the base stations, the terminal apparatus 200 can efficiently observe the beams provided by the plurality of base stations.

In the present embodiment, the beam groups can be formed with the use of a plurality of beams provided by the plurality of base stations 100 or beams provided by a plurality of antenna panels. With the beams from the plurality of base stations 100 or the plurality of antenna panels grouped into one beam group in this way, the terminal apparatus 200 observes the beams in continuous time, and hence the terminal apparatus 200 can have operating time without interruption. Thus, when not performing the beam observation operation, the terminal apparatus 200 can enter a mode consuming electric power a little, for example, which can lead to a reduction in power consumption.

In a case where there are plural, for example, five base stations 100, the terminal apparatus 200 is required to observe beam sweeping by the different base stations 100 in different five time periods. This increases a burden on the terminal apparatus 200. Meanwhile, the technique that groups beams from the plural base stations 100 or plural antenna panels into one beam group is more effective in sweeping using accurate beams than in sweeping using rough beams. When the plural base stations 100 transmits beams to the terminal apparatus 200 in cooperation with each other in continuous time, a burden on the terminal apparatus 200 can be reduced.

Figure 18:
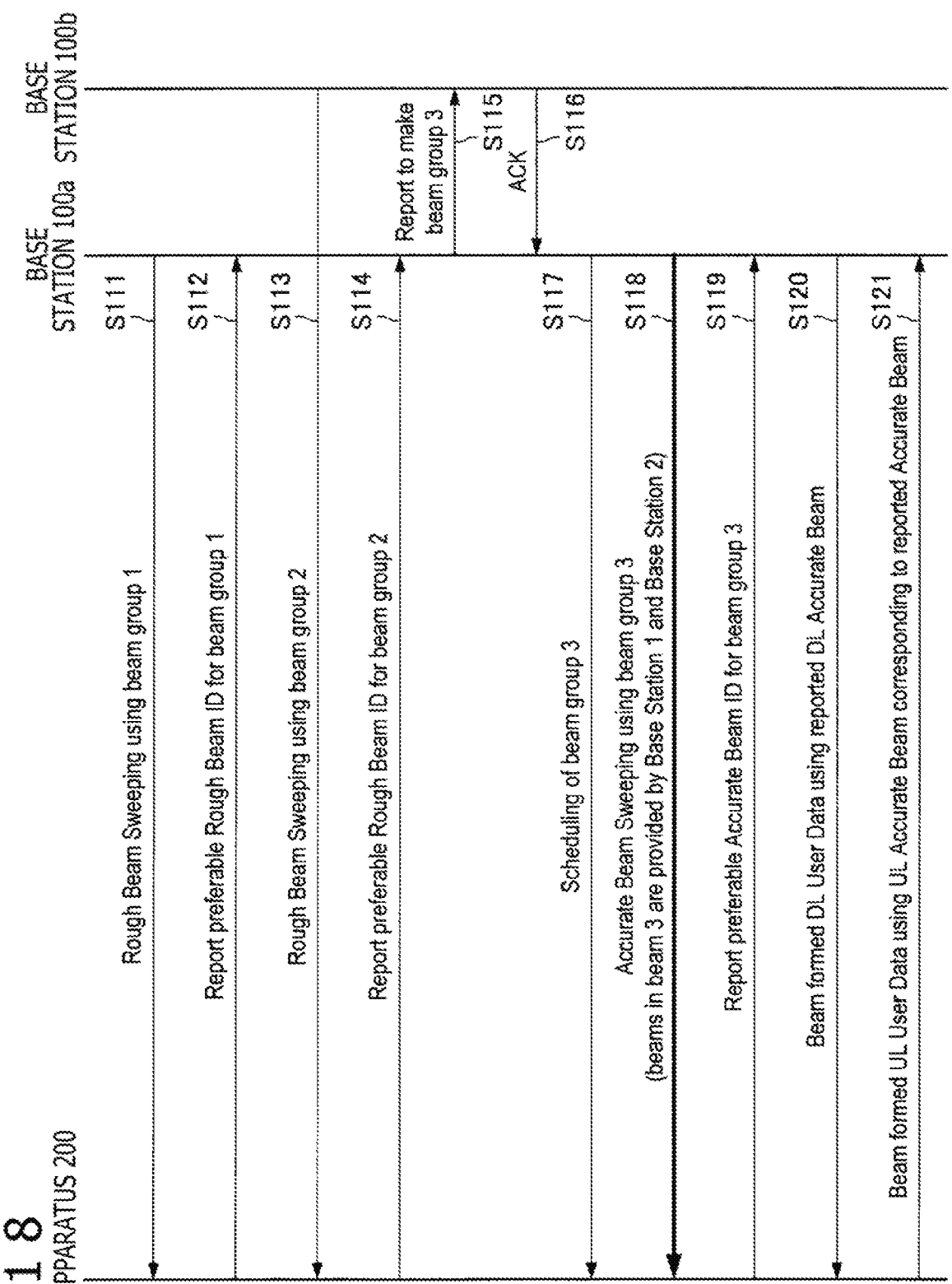
FIG. 18 is a flowchart illustrating operation examples of the base stations 100a and 100b and the terminal apparatus 200 according to the embodiment of the present disclosure.

FIG. 18 is a flowchart illustrating operation examples of the base stations 100a and 100b and the terminal apparatus 200 according to the embodiment of the present disclosure. FIG. 18 illustrates operation examples when the terminal apparatus 200 determines an optimal beam from beams emitted by the base stations 100a and 100b, and transmission or reception of data is performed between the terminal apparatus 200 and the base stations 100a and 100b by beamforming. Now, the operation examples of the base stations 100a and 100b and the terminal apparatus 200 according to the embodiment of the present disclosure are described with reference to FIG. 18.

The base station 100a first performs transmission sweeping using rough beams in a beam group unit on the basis of schedule information regarding a rough beam group that has been provided to the terminal apparatus 200 in advance (Step S111).

The terminal apparatus 200 reports the number of a rough beam desired for the terminal apparatus 200 to the base station 100a (Step S112). The terminal apparatus 200 determines the desired rough beam on the basis of whether or not a beam has the largest reception electric power, for example.

When beam sweeping by the base station 100a is finished, the base station 100b configured to emit beams belonging to the same beam group subsequently performs transmission sweeping using the rough beams in a beam group unit on the basis of schedule information regarding the rough beam group that has been provided to the terminal apparatus 200 in advance (Step S113).

The terminal apparatus 200 reports the number of a rough beam desired for the terminal apparatus 200 to the base station 100*b* (Step S114). The terminal apparatus 200 determines the desired rough beam on the basis of whether or not a beam has the largest reception electric power, for example.

When beam sweeping by the base station 100*b* is finished, the base station 100*a* forms, when providing a plurality of accurate beams to the base station 100*b*, a beam group including the plurality of accurate beams (referred to as "Beam Group 3"). The base station 100*a* notifies, in order to form the beam group, the base station 100*b* of a request and a resource location of the beam group (Step S115). In a case of responding to the request from the base station 100*a*, the base station 100*b* sends back ACK (Step S116).

The base station 100*a* that has received ACK from the base station 100*b* notifies the terminal apparatus 200 of a time or frequency resource location of Beam Group 3 (Step S117). The base stations 100*a* and 100*b* form Beam Group 3 in cooperation with each other by using the scheduled time or frequency resource, to thereby perform beam sweeping with the accurate beams (Step S118).

The terminal apparatus 200 reports the number of an accurate beam desired for the terminal apparatus 200 to the base station 100*a* (Step S119). The terminal apparatus 200 determines the desired accurate beam on the basis of whether or not a beam has the largest reception electric power, for example.

When receiving the report of the number of the accurate beam from the terminal apparatus 200, the base station 100 transmits DL user data to the terminal by using the accurate beam (Step S120). Then, in a case where channel reciprocity is supposed to be held, the base station 100 uses the same accurate beam as the accurate beam for transmission to receive data from the terminal, and thus receives UL user data from the terminal apparatus 200 (Step S121).

The terminal apparatus 200 operates in this way, thereby being capable of observing the accurate beams from the plurality of base stations by observing only one location. To achieve this, a concept of beam groups formed by a plurality of base stations is important. In the operation examples illustrated in FIG. 18, the terminal apparatus 200 can receive beam sweeping with the beam group formed by the base stations 100*a* and 100*b*, and also receive, at another time, beam sweeping with a beam group formed by another base station. Thus, according to the embodiment of the present disclosure, in a case where the number of base stations related to the terminal apparatus 200 increases, a burden on the terminal apparatus 200 can be reduced.

As described above, the beam group can not only be a group of beams in the same base station, but also be a group of beams from a plurality of base stations. The above-mentioned effect is obtained through grouping of beams from a plurality of base stations. Specifically, a burden on the terminal apparatus 200 is smaller in a case where the terminal apparatus 200 sets beams from a plurality of base stations as one group and observes beam sweeping with the beam group than in a case where the terminal apparatus 200 monitors the beams from the base stations one by one to determine an appropriate beam. Meanwhile, in a case where there are a plurality of base stations or a case where a plurality of antenna panels is mounted on a base station, the number of beam groups is predicted to increase, and how long the terminal apparatus 200 is required to monitor beam sweeping to observe whole beam sweeping is unknown.

Accordingly, the base station 100 notifies the terminal of a beam group that the terminal apparatus 200 is to observe or the period of a plurality of beam groups and the start time of beam sweeping with the beam groups. The period is a period longer than a period in which a synchronization signal is being provided, for example, 5 milliseconds or 10 milliseconds. The terminal apparatus 200 observes beams of the plurality of target beam groups during the period. With beam observation in the specified period, the terminal apparatus 200 positively observes all the beams from the base station 100.

Figure 19:
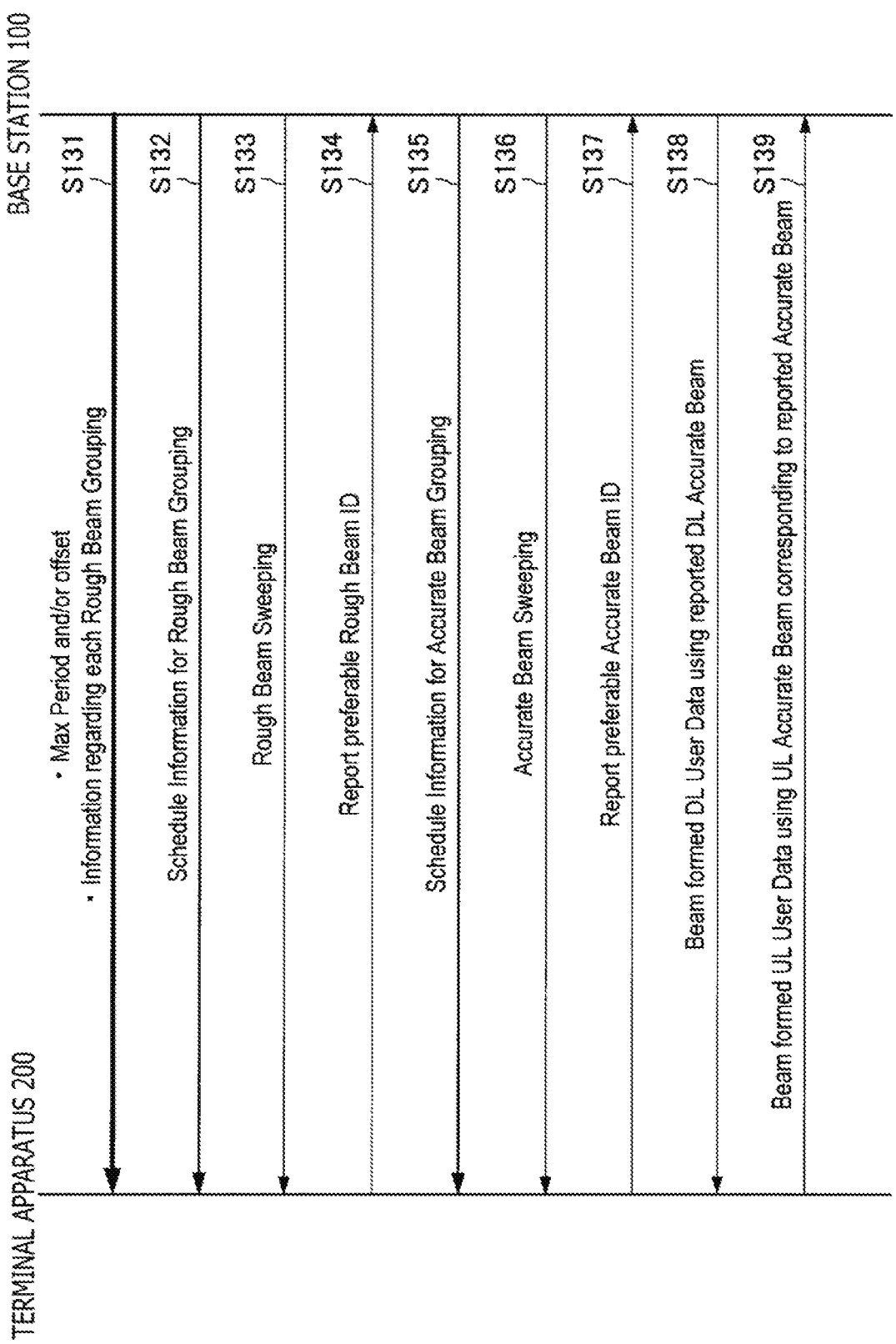
FIG. 19 is a flowchart illustrating operation examples of the base station 100 and the terminal apparatus 200 according to the embodiment.

FIG. 19 is a flowchart illustrating operation examples of the base station 100 and the terminal apparatus 200 according to the embodiment of the present disclosure. FIG. 19 illustrates operation examples when the terminal apparatus 200 determines an optimal beam from beams emitted by the base station 100, and transmission or reception of data is performed between the base station 100 and the terminal apparatus 200 by beamforming. Now, the operation examples of the base station 100 and the terminal apparatus 200 according to the embodiment of the present disclosure are described with reference to FIG. 19.

The base station 100 notifies the terminal apparatus 200 of information regarding the maximum period and an offset or the maximum period or the offset (Step S131). Table 2 is an example of information of which the terminal apparatus 200 is notified by the base station 100.

TABLE 2

| Items | Contents |
| --- | --- |
| A period in which all beam groups can be observed | Example: 500 ms |
| The beginning of the above period (offset) | Example: system frame number = 10 (SFN is specified by a number given to a synchronization period) |

(Table 2: examples of information associated with a beam group)

The subsequent operation is similar to the one illustrated in FIG. 17. That is, the base station 100 first transmits schedule information regarding a rough beam group to the terminal apparatus 200 (Step S132). Subsequently, the base station 100 performs, on the terminal apparatus 200, transmission sweeping using the rough beams in a beam group unit on the basis of the schedule information regarding the rough beam group, which has been transmitted in Step S132 (Step S133). At this time, the terminal apparatus 200 observes the beams by using the information transmitted from the base station 100 in Step S131. Then, the terminal apparatus 200 reports the number of a rough beam desired for the terminal apparatus 200 to the base station 100 (Step S134).

When receiving the report of the number of the rough beam from the terminal apparatus 200, the base station 100 transmits, to the terminal apparatus 200, schedule information regarding an accurate beam group corresponding to the rough beam (Step S135). Subsequently, the base station 100 performs, on the terminal apparatus 200, transmission sweeping using the accurate beams in a beam group unit on the basis of the schedule information regarding the accurate beam group, which has been transmitted in Step S135 (Step S136). At this time, the terminal apparatus 200 observes the beams by using the information transmitted from the base station 100 in Step S131.

The terminal apparatus 200 reports the number of an accurate beam desired for the terminal apparatus 200 to the base station 100 (Step S137). When receiving the report of the number of the accurate beam from the terminal apparatus 200, the base station 100 transmits DL user data to the terminal by using the accurate beam (Step S138). Then, in a case where channel reciprocity is supposed to be held, the base station 100 uses the same accurate beam as the accurate beam for transmission to receive data from the terminal, and thus receives UL user data from the terminal apparatus 200 (Step S139).

With the base station 100 notifying the terminal apparatus 200 of the maximum period of beam sweeping, the terminal apparatus 200 positively monitors all the beam groups by monitoring beams in the period. What is important here is that the period information that the base station 100 provides is associated with neither a beam period nor a beam group period, but is associated with a period that allows the terminal apparatus 200 to observes a plurality of beams or beam groups completely by observing the beams or beam groups in the time interval.

In the case of UE specific beam groups, since the base station 100 specifies a direction in which the terminal apparatus 200 is to monitor beam groups, a burden on the terminal apparatus 200 is small. In a case where there is a plurality of cell specific beam groups, however, when there is no information regarding which beam group is to be referred to, the terminal apparatus 200 observes beam sweeping belonging to all beam groups even though there is no need for the terminal apparatus 200 to monitor all the beam groups.

Accordingly, the terminal apparatus 200 receives information regarding not only the period but also which beam group is to be referred to from the base station 100, thereby being capable of observing beam sweeping with a specific beam group instead of observing beam sweeping belonging to all the beam groups.

In order to allow the terminal apparatus 200 to freely select a beam group to monitor, the base station 100 notifies the terminal apparatus 200 of the details of beam group information. The base station 100 does not notify information regarding each beam, but provides information regarding each beam group, which is a bundle of beams. With provision of the information regarding each beam group, the terminal apparatus 200 can reduce electric power consumed for reception to the minimum necessity. The base station 100 can notify the terminal apparatus 200 of the beam group information with system information. In the flowchart of FIG. 19, the base station 100 may notify the terminal apparatus 200 of the beam group information in Step S131. Table 3 is an example of beam group information of which the terminal apparatus 200 is notified by the base station 100.

TABLE 3

| Items | Contents |
|---|---|
| Beam group ID | Identification for specifying a beam group |
| Layer | Rough beam/accurate beam |
| Base station/TRP | Base stations from which a beam group has been transmitted In a case where a beam group has been transmitted from one base station, the |

TABLE 3-continued

| Items | Contents |
|---|---|
| | one base station is described In a case where a beam group is formed by a plurality of base stations, the plurality of base stations is described In the case where a beam group is formed by a plurality of base stations, which station provides which beam can also be described Example 1: Base Station 1 Example 2: Base Station 1, Base Station 2, and Base Station 3 Example 3: Base Station 1: Beam 1 to Beam 3, Base Station 2: Beam 4 to Beam 9, and Base Station 3: Beam 10 to Beam 13 |
| Panel number | Panels of a base station from which a beam group has been transmitted |
| High-speed movement | To be monitored by a high-speed terminal |
| Low-speed movement | To be monitored by a low-speed or fixed terminal |
| Use case | To be monitored by a terminal supporting low latency communication/to be monitored by a terminal supporting normal communication/to be monitored by an MTC terminal |

(Table 3: examples of information associated with a beam group)

A technology that allows a plurality of terminals to simultaneously receive downlink data at the same frequency and the same time is called "downlink multi user MIMO (DL MU-MIMO)." What is important in performing DL MU-MIMO is to determine which combination of terminals is used to perform MU-MIMO. This is called "terminal pairing." In this pairing, it is important that a beam appropriate for a terminal A does not serve as an interference source for another terminal B (the terminal B can hardly receive the beam), and vice versa. It is important that a beam appropriate for the terminal B does not serve as an interference source for the terminal A. It is important that when forming a beam group, a base station forms the beam group including beams for the terminal A and the terminal B, which are different from each other. The beam group serves as a beam group for the terminal A and the terminal B. When the base station does not specify how the terminal A and the terminal B each evaluate the beam group, however, the terminal A cannot determine which beam preferably has high electric power and which beam preferably has low electric power.

Accordingly, the base station 100 according to the present embodiment notifies the terminal apparatus 200 of, of the plurality of beam groups, which beam group is for desired beam selection and which beam group serves as an interference signal for beam evaluation. Table 4 is an example of beam group information of which the terminal apparatus 200 is notified by the base station 100.

TABLE 4

| Beam group number | Contents |
|---|---|
| 1 | Desired signal (select beam having large reception electric power) |
| 2 | Desired signal (select beam having large reception electric power) |

TABLE 4-continued

| Beam group number | Contents |
| --- | --- |
| 3 | Interference signal (select beam having large reception electric power) |
| 4 | Interference signal (select beam having small reception electric power) |
| 5 | Interference signal (select two beams having large reception electric power and three beams having small interference electric power) |

(Table 4: examples of information associated with a beam group)

In Table 4, in the parentheses in the "Contents" column, examples of how the terminal apparatus 200 uses the contents are described. The base station 100 may or may not include the information in the parentheses in the information of which the terminal apparatus 200 is notified.

Further, the base station 100 notifies the terminal apparatus 200 of, in one beam group to be provided, which beam is for desired beam selection and which beam serves as an interference signal for beam evaluation. Table 5 is an example of beam group information of which the terminal apparatus 200 is notified by the base station 100.

TABLE 5

| Beam number | Contents |
| --- | --- |
| 1 to 5 | Desired signal |
| 5 to 13 | Interference signal |

(Table 5: examples of information associated with beams in a beam group)

The terminal apparatus 200 selects, as desired signals and interference signals, signals having large reception electric power. A beam having the largest reception electric power in the desired signal is a desired beam. A beam having the largest reception electric power in the interference signal indicates that the interference signal is largest.

The terminal apparatus 200 evaluates the beam groups in this way, thereby being capable of calculating SINR (signal-to-interference-plus-noise ratio) in consideration of MU-MIMO pairing to provide, to the base station 100, feedback about receivable modulation method and encoding rate, and channel quality information.

Even when the terminal apparatus 200 does not send back channel quality information to the base station 100, the terminal apparatus 200 can collect information for MU-MIMO pairing with the beam groups or by clarifying desired beams and interference beams in a beam group. The terminal apparatus 200 notifies the base station 100 of the collected information. The base station 100 can efficiently perform pairing of the terminal measure 200 by using the information transmitted from the terminal apparatus 200.

In the example descried above, it is assumed that the base station 100 provides beam sweeping with the beam groups periodically. The following case is, however, conceivable: it is preferred that the base station 100 dynamically change, for example, the period of beam sweeping with the beam groups. In a case where a location of a beam group is specified with system information, RRC signaling, or another downlink control signal, the settings of beam groups are changed in a semi-static manner, and hence such methods cannot be used to dynamically change the settings.

Accordingly, a concept of system information regarding each beam group (beam group system information) is introduced.

Thus, the base station 100 provides, in a beam group, information regarding the beam group. Specifically, the base station 100 provides, as information regarding a beam group, information common to a plurality of beams belonging to the beam group and information regarding each beam belonging to the beam group. The information common to a plurality of beams belonging to the beam group is a resource location to which the beam group is transmitted next. This resource location is notified with a time resource and a frequency resource. The information regarding each beam belonging to the beam group is information regarding transmission electric power of each beam and whether or not each beam is an interference source. The information given above is an example, and what is important is that information regarding a beam group and information regarding beams belonging to the beam group are provided as beam group system information with the use of the beams belonging to the beam group. In general, system information is provided as base station or cell information, but in the present embodiment, as system information regarding a beam group that is a bundle of beams, the system information is provided with the beam group.

It is assumed that beams belonging to a beam group are provided to the terminal apparatus 200 by beam sweeping at different times. In such a case, the terminal apparatus 200 monitoring the beam group cannot observe all the beams. Thus, all beams belonging to a certain beam group have the same beam group system information. With the beam group system information, all beams belonging to a certain beam group provide the same information.

How to reduce the overhead of resources that are used for beam sweeping is now considered. When performing beam sweeping four times, in the last beam sweeping, the base station 100 provides, to the terminal apparatus 200, one set of a plurality of periods and offsets set in advance that the base station 100 is to take, with beam group system information provided by beam sweeping. The following are important: the period and the offset are not specified every beam sweeping and the information is provided once per several times of beam sweeping, and how information regarding which set of periods and offsets set in advance is to be taken is provided.

Figure 20:
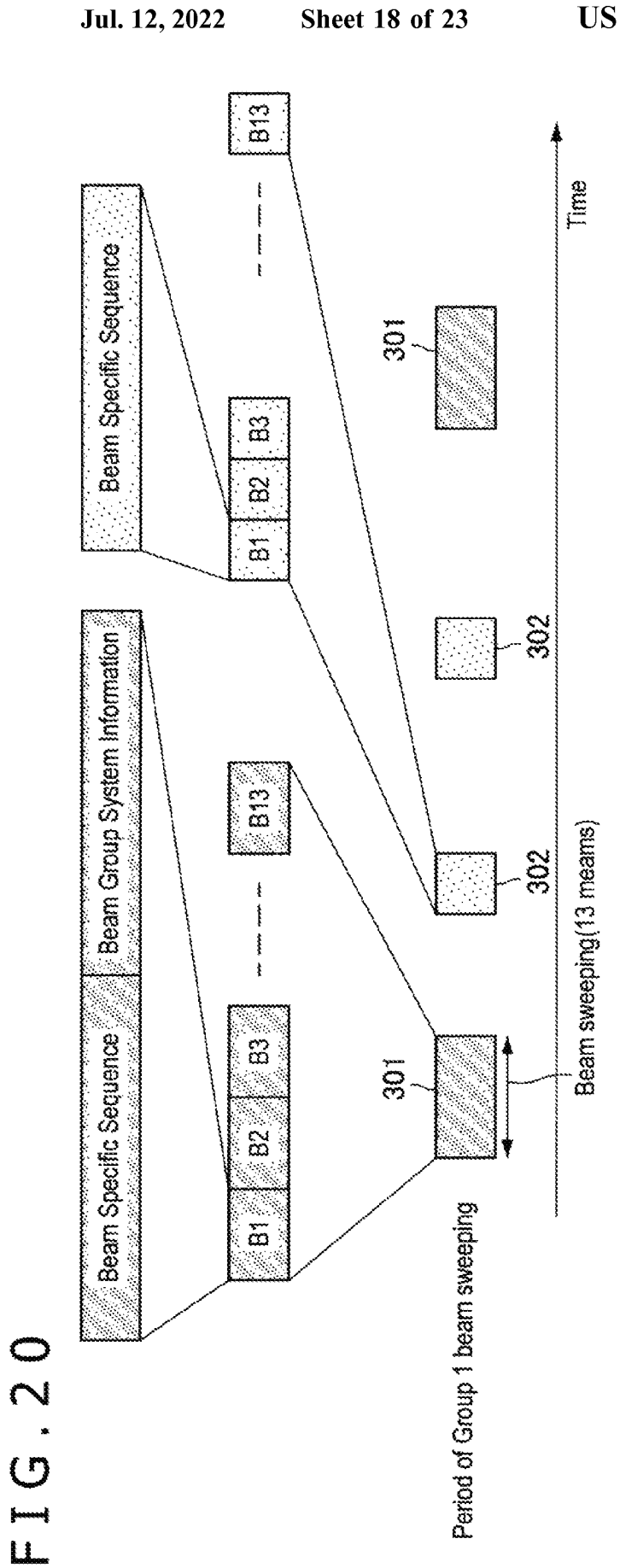
FIG. 20 is an explanatory diagram illustrating an example of a beam group system information providing pattern by the base station 100.

FIG. 20 is an explanatory diagram illustrating an example of a beam group system information providing pattern by the base station 100. FIG. 20 illustrates an example in which beam group system information is provided once per three times of beam sweeping. Reference numeral 301 indicates the period of beam sweeping having information that is beam group system information. Reference numeral 302 indicates the period of beam sweeping not having information that is beam group system information. In a case where beam sweeping having information that is beam group system information is performed, the base station 100 has the beam group system information after a beam specific sequence. This sequence is a unique sequence such as an M-sequence, and sequences to be used for beams are different from each other. As part of beam sweeping that is performed three times, beam sweeping not having such beam group system information is performed twice. Thus, when performing beam sweeping three times, the base station 100 can provide beams for performing beam sweeping twice with fewer resources than a beam having the beam group system information.

Figure 21:
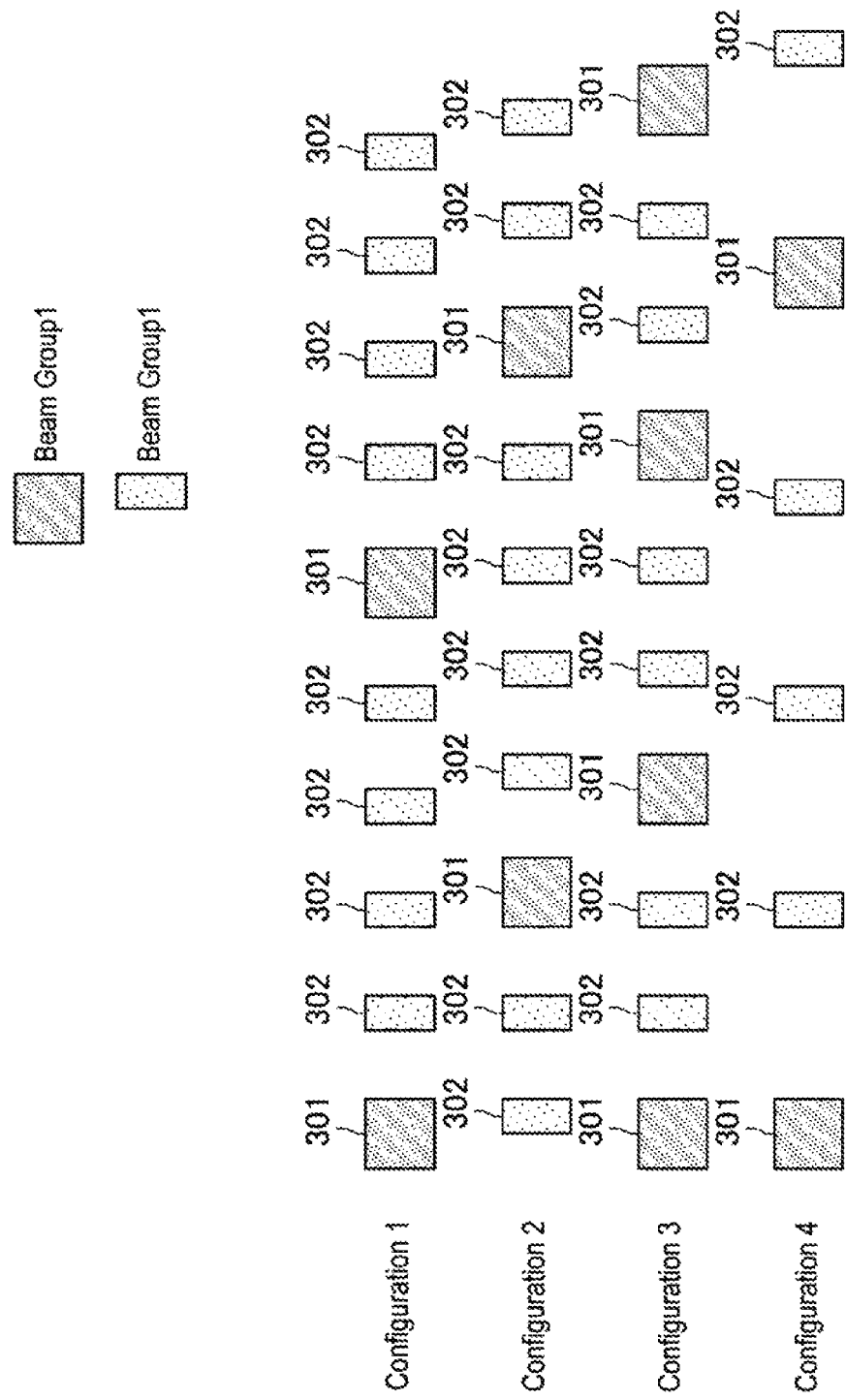
FIG. 21 is an explanatory diagram illustrating an example of a beam group system information providing pattern by the base station 100.

FIG. 21 is an explanatory diagram illustrating an example of a beam group system information providing pattern by the base station 100. In FIG. 21, each block represents the period of beam sweeping with 13 beams. Further, each block represents beam sweeping with the same beam group.

Reference numeral 301 indicates, as in FIG. 20, beam sweeping having, in each of 13 beams, beam group system information that is information associated with the beam group after a beam specific sequence. Reference numeral 302 indicates, as in FIG. 20, beam sweeping only having a beam specific sequence and not having beam group system information. Resources required for beam sweeping indicated by reference numeral 302 are fewer than resources required for beam sweeping indicated by reference numeral 301.

The base station 100 notifies the terminal apparatus 200 of four configurations in advance with RRC signaling or entire-cell system information in a semi-static manner as illustrated in FIG. 21. Then, the base station 100 specifies, with the beam group system information, a configuration to be used next from the four configurations set in advance. Configuration 1 is a setting that provides beam group system information once per five times of beam sweeping. Configuration 2 has the same period and provision frequency of beam group system information as Configuration 1 but a different offset. Configuration 3 is a setting that provides beam group system information once per three times of beam sweeping. Configuration 4 is a setting that provides beam group system information once per five times of beam sweeping, and has a longer period between beam sweeping and beam sweeping than Configuration 1. The base station 100 dynamically selects one of the beam group configurations set in advance, thereby being capable of flexibly and dynamically changing the settings of beam sweeping. With this, the base station 100 can optimize resources that are used for beam sweeping, thereby being capable of reducing signaling overhead by beam sweeping. Further, the base station 100 can be expected to have enhanced throughput.

Note that, in the example described above, the base station 100 generates beam groups each including a plurality of directional beams and changes the settings of beam sweeping between the beam groups, but the present disclosure is not limited to the example. The terminal apparatus 200 may generate beam groups each including a plurality of directional beams in a similar manner. In such a case, the terminal apparatus 200 may execute the operation of changing the settings of beam sweeping between the beam groups as described above.

2. Application Example

The technology according to the present disclosure is applicable to various products. For example, the base station 100 may be realized as any type of eNB (evolved Node B) such as a macro eNB or a small eNB. A small eNB may be an eNB that covers a smaller cell than a macro cell, such as a pico eNB, a micro eNB, or a home (femto) eNB. Alternatively, the base station 100 may be realized as another type of base station such as a Node B or a BTS (Base Transceiver Station). The base station 100 may include a main body configured to control wireless communication (also referred to as "base station apparatus") and one or more RRHs (Remote Radio Heads) disposed in a different place from the main body. Further, various types of terminals, which are described later, may operate as the base station 100 by temporarily or semi-permanently executing the base station function.

Further, for example, the terminal apparatus 200 may be realized as a mobile terminal such as a smartphone, a tablet PC (Personal Computer), a notebook computer, a portable game terminal, a portable/dongle type mobile router, or a digital camera, or an in-vehicle terminal such as a car navigation apparatus. Further, the terminal apparatus 2200 may be realized as a terminal configured to perform M2M (Machine To Machine) communication (also referred to as "MTC (Machine Type Communication) terminal"). In addition, the terminal apparatus 2200 may be a wireless communication module that is mounted on such a terminal (for example, an integrated circuit module including one die).

(Application Example of Base Station)

First Application Example

Figure 22:
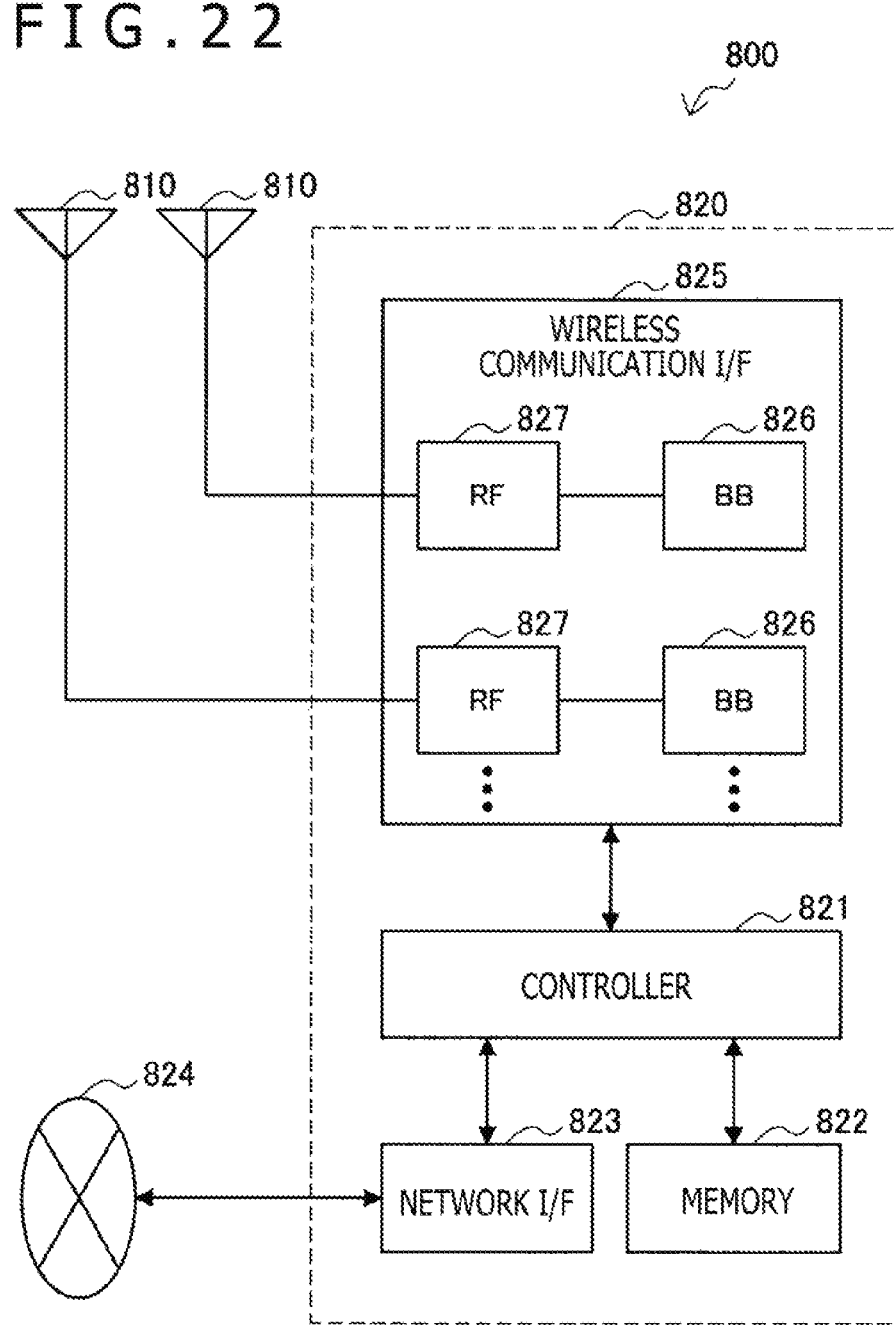
FIG. 22 is a block diagram illustrating a first example of the schematic configuration of an eNB to which the technology according to the present disclosure may be applied.

FIG. 22 is a block diagram illustrating a first example of the schematic configuration of an eNB to which the technology according to the present disclosure may be applied. An eNB 800 includes one or more antennas 810 and a base station apparatus 820. The antennas 810 may each be connected to the base station apparatus 820 through an RF cable.

The antennas 810 each include one or a plurality of antenna elements (for example, a plurality of antenna elements of a MIMO antenna), and are used when the base station apparatus 820 transmits or receives wireless signals. The eNB 800 may include the plurality of antennas 810, as illustrated in FIG. 22. The plurality of antennas 810 may be compatible with a plurality of frequency bands used by the eNB 800, for example. Note that, although FIG. 22 illustrates the example in which the eNB 800 includes the plurality of antennas 810, the eNB 800 may only include one antenna 810.

The base station apparatus 820 includes a controller 821, a memory 822, a network interface 823, and a wireless communication interface 825.

The controller 821 may be, for example, a CPU or a DSP, and operates various functions of a higher layer of the base station apparatus 820. For example, the controller 821 generates a data packet from data in signals processed by the wireless communication interface 825, and transfers the generated packet via the network interface 823. The controller 821 may bundle data from a plurality of baseband processors to generate a bundled packet, and transfer the generated bundled packet. Further, the controller 821 may have a logical function of executing control such as radio resource control, radio bearer control, mobility management, admission control, or scheduling. Further, the controller 821 may execute the control in question in corporation with a neighboring eNB or a core network node. The memory 822 includes a RAM and a ROM, and stores a program that is executed by the controller 821, and various types of control data (for example, terminal list, transmission electric power data, and scheduling data).

The network interface 823 is a communication interface for connecting the base station apparatus 820 to a core network 824. The controller 821 may communicate with a core network node or another eNB via the network interface 823. In this case, the eNB 800 may be connected to a core network node or another eNB through a logical interface (for example, S1 interface or X2 interface). The network interface 823 may be a wired communication interface or a wireless communication interface for wireless backhaul. In a case where the network interface 823 is a wireless communication interface, the network interface 823 may use a higher frequency band for wireless communication than a frequency band used by the wireless communication interface 825.

The wireless communication interface 825 supports any cellular communication scheme such as LTE (Long Term Evolution) or LTE-Advanced, and provides wireless connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, to thereby execute various types of signal processing of layers (for example, L1, MAC (Medium Access Control), RLC (Radio Link Control), and PDCP (Packet Data Convergence Protocol)). The BB processor 826 may have a part or all of the above-mentioned logical functions instead of the controller 821. The BB processor 826 may be a memory configured to store a communication control program, or a module including a processor configured to execute the program in question and related circuits. The functions of the BB processor 826 may be changed through updating of the program. Further, the module may be a card or blade that is inserted into a slot of the base station apparatus 820. Alternatively, the module may be a chip that is mounted on the card or the blade. Meanwhile, the RF circuit 827 may include, for example, a mixer, a filter, and an amplifier, and transmits and receives wireless signals via the antenna 810.

The wireless communication interface 825 may include the plurality of BB processors 826, as illustrated in FIG. 22. The plurality of BB processors 826 may be compatible with a plurality of frequency bands used by the eNB 800, for example. Further, the wireless communication interface 825 may include the plurality of RF circuits 827, as illustrated in FIG. 22. The plurality of RF circuits 827 may correspond to a plurality of antenna elements, for example. Note that, although FIG. 22 illustrates the example in which the wireless communication interface 825 includes the plurality of BB processors 826 and the plurality of RF circuits 827, the number of the BB processors 826 or RF circuits 827 of the wireless communication interface 825 may be one.

In the eNB 800 illustrated in FIG. 22, one or more components in the base station 100 (for example, processing unit 150), which are described with reference to FIG. 10, may be implemented by the wireless communication interface 825. Alternatively, at least some of these components may be implemented by the controller 821. As an example, the eNB 800 may have mounted thereon a module including a part of the wireless communication interface 825 (for example, BB processor 826) or all components thereof, and/or the controller 821, and the one or more components may be implemented by the module in question. In this case, the module may store a program for causing the processor to function as the one or more components (in other words, a program for causing the processor to execute operations of the one or more components), to thereby execute the program in question. As another example, the eNB 800 may have installed thereon the program for causing the processor to function as the one or more components, and the wireless communication interface 825 (for example, BB processor 826) and/or the controller 821 may execute the program in question. As described above, the eNB 800, the base station apparatus 820, or the module may be provided as an apparatus including the one or more components, and the program for causing the processor to function as the one or more components may be provided. A readable recording medium having recorded thereon the program may also be provided.

Further, in the eNB 800 illustrated in FIG. 22, the wireless communication unit 120 described with reference to FIG. 10 may be implemented by the wireless communication interface 825 (for example, RF circuit 827). Further, the antenna unit 110 may be implemented by the antenna 810. Further, an interface between the processing unit 240 and an upper node or another base station apparatus may be implemented by the controller 821 and/or the network interface 823.

Second Application Example

Figure 23:
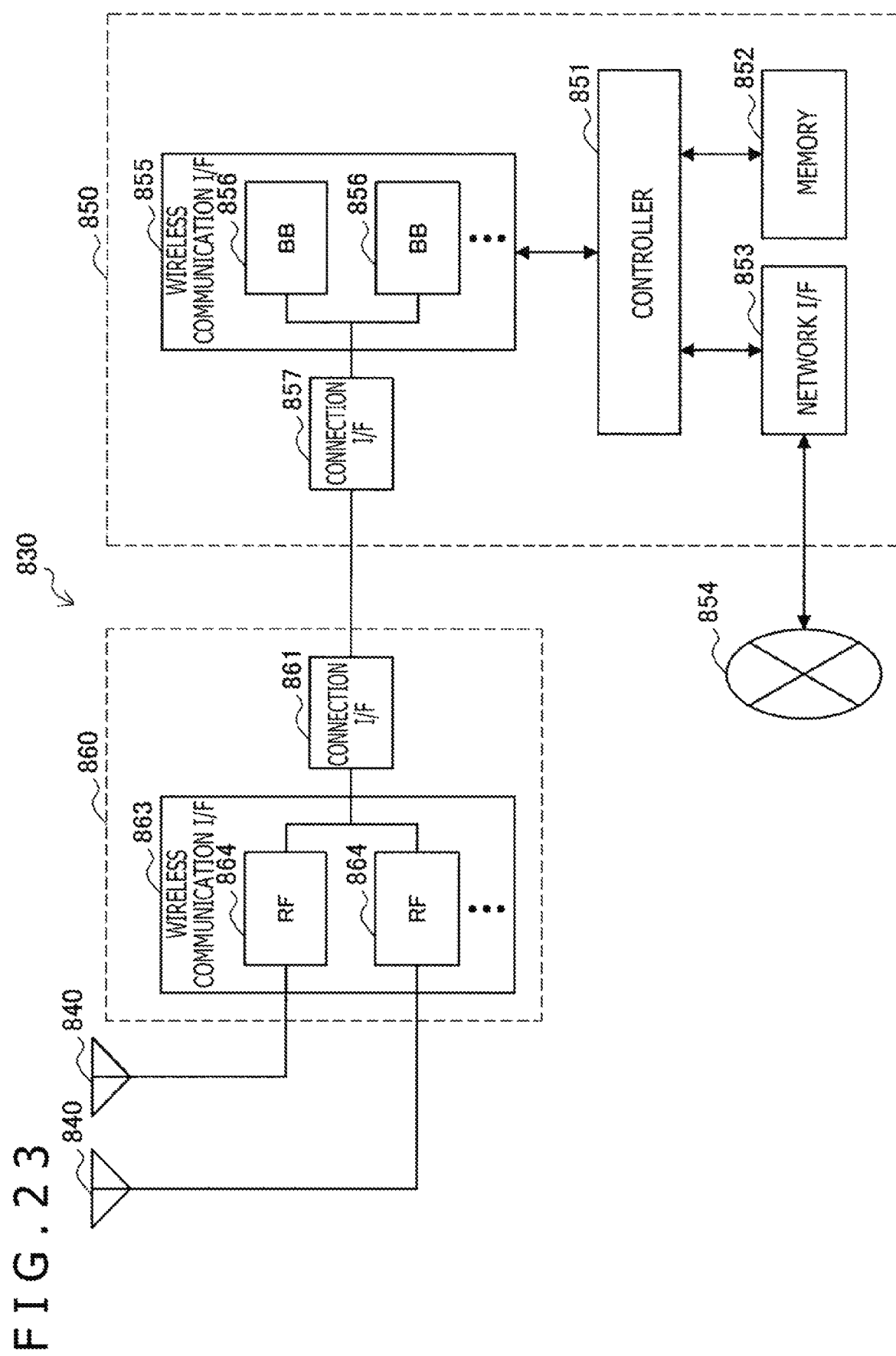
FIG. 23 is a block diagram illustrating a second example of the schematic configuration of the eNB to which the technology according to the present disclosure may be applied.

FIG. 23 is a block diagram illustrating a second example of the schematic configuration of an eNB to which the technology according to the present disclosure may be applied. An eNB 830 includes one or more antennas 840, a base station apparatus 850, and an RRH 860. The antennas 840 may each be connected to the RRH 860 through an RF cable. Further, the base station apparatus 850 and the RRH 860 may be connected to each other through a high-speed line such as an optical fiber cable.

The antennas 840 each include one or a plurality of antenna elements (for example, a plurality of antenna elements of a MIMO antenna), and are used when the RRH 860 transmits or receives wireless signals. The eNB 830 may include the plurality of antennas 840, as illustrated in FIG. 23. The plurality of antennas 840 may be compatible with a plurality of frequency bands used by the eNB 830, for example. Note that, although FIG. 23 illustrates the example in which the eNB 830 includes the plurality of antennas 840, the eNB 830 may include one antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 22.

The wireless communication interface 855 supports any cellular communication scheme such as LTE or LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is similar to the BB processor 826 described with reference to FIG. 22, except that the BB processor 856 is connected to the RF circuit 864 of the RRH 860 via the connection interface 857. The wireless communication interface 855 may include the plurality of BB processors 856, as illustrated in FIG. 23. The plurality of BB processors 856 may be compatible with a plurality of frequency bands used by the eNB 830, for example. Note that, although FIG. 23 illustrates the example in which the wireless communication interface 855 includes the plurality of BB processors 856, the wireless communication interface 855 may only include one BB processor 856.

The connection interface 857 is an interface for connecting the base station apparatus 850 (wireless communication interface 855) to the RRH 860. The connection interface 857 may also be a communication module for communication in the high-speed line that connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may also be a communication module for communication in the high-speed line.

The wireless communication interface 863 transmits and receives wireless signals via the antenna 840. The wireless communication interface 863 may typically include, for example, the RF circuit 864. The RF circuit 864 may include, for example, a mixer, a filter, and an amplifier, and transmits and receives wireless signals via the antenna 840. The wireless communication interface 863 may include the plurality of RF circuits 864, as illustrated in FIG. 23. The plurality of RF circuits 864 may correspond to a plurality of antenna elements, for example. Note that, although FIG. 23 illustrates the example in which the wireless communication interface 863 includes the plurality of RF circuits 864, the wireless communication interface 863 may include one RF circuit 864.

In the eNB 830 illustrated in FIG. 23, one or more components in the base station 100 (for example, processing unit 140), which are described with reference to FIG. 10, may be implemented by the wireless communication interface 855 and/or the wireless communication interface 863. Alternatively, at least some of these components may be implemented by the controller 851. As an example, the eNB 830 may have mounted thereon a module including a part of the wireless communication interface 855 (for example, BB processor 856) or all components thereof, and/or the controller 851, and the one or more components may be implemented by the module in question. In this case, the module may store a program for causing the processor to function as the one or more components (in other words, a program for causing the processor to execute operations of the one or more components), to thereby execute the program in question. As another example, the eNB 830 may have installed thereon the program for causing the processor to function as the one or more components, and the wireless communication interface 855 (for example, BB processor 856) and/or the controller 851 may execute the program in question. As described above, the eNB 830, the base station apparatus 850, or the module may be provided as an apparatus including the one or more components, and the program for causing the processor to function as the one or more components may be provided. A readable recording medium having recorded thereon the program may also be provided.

Further, in the eNB 830 illustrated in FIG. 23, the wireless communication unit 120 described with reference to FIG. 10 may be implemented by the wireless communication interface 825 (for example, RF circuit 827). Further, the antenna unit 110 may be implemented by the antenna 810. Further, an interface between the processing unit 240 and an upper node or another base station apparatus may be implemented by the controller 821 and/or the network interface 823.

Application Example of Terminal Apparatus

First Application Example

Figure 24:
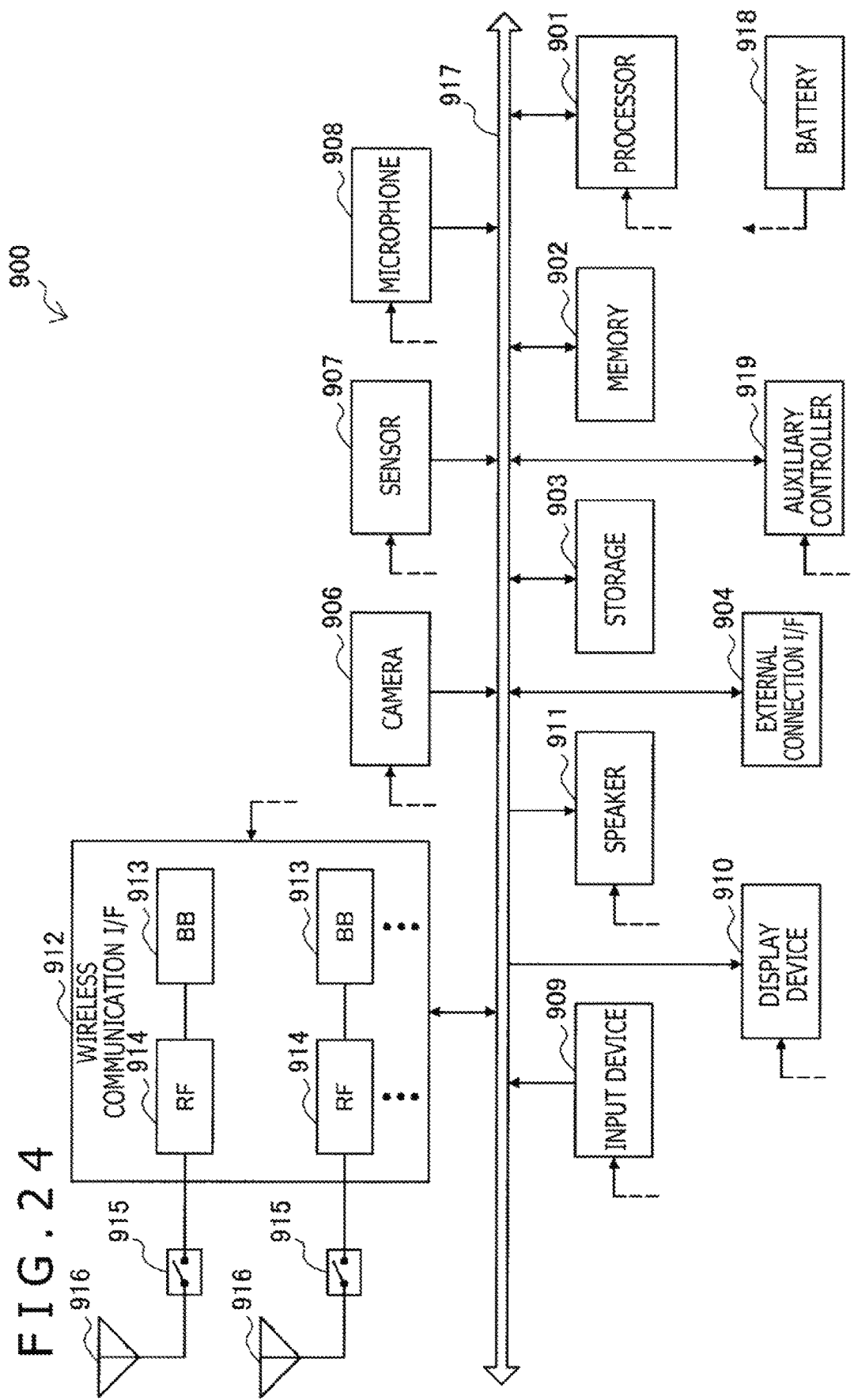
FIG. 24 is a block diagram illustrating an example of the schematic configuration of a smartphone 900 to which the technology according to the present disclosure may be applied.

FIG. 24 is a block diagram illustrating an example of the schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a SoC (System on Chip), and controls functions of an application layer and another layer of the smartphone 900. The memory 902 includes a RAM and a ROM, and stores a program that is executed by the processor 901, and data. The storage 903 may include a storage medium such as a semiconductor memory or a hard disk. The external connection interface 904 is an interface for connecting an external device such as a memory card or a USB (Universal Serial Bus) device to the smartphone 900.

The camera 906 includes an image sensor such as a CCD (Charge Coupled Device) or a CMOS (Complementary Metal Oxide Semiconductor), and generates a captured image. The sensor 907 may include a group of sensors such as a measurement sensor, a gyro sensor, a geomagnetic sensor, and an acceleration sensor. The microphone 908 converts sound that is input to the smartphone 900 to audio signals. The input device 909 includes, for example, a touch sensor configured to detect touch onto a screen of the display device 910, a keypad, a keyboard, a button, or a switch, and receives an operation or information input from a user. The display device 910 includes a screen such as a liquid crystal display (LCD) or an organic light-emitting diode (OLED) display, and displays an output image of the smartphone 900. The speaker 911 converts audio signals that are output from the smartphone 900 to sound.

The wireless communication interface 912 supports any cellular communication scheme such as LTE or LTE-Advanced, and executes wireless communication. The wireless communication interface 912 may typically include, for example, a BB processor 913 and an RF circuit 914. The BB processor 913 may perform, for example, encoding/decoding, modulating/demodulating, and multiplexing/demultiplexing, to thereby execute various types of signal processing for wireless communication. Meanwhile, the RF circuit 914 may include, for example, a mixer, a filter, and an amplifier, and transmits and receives wireless signals via the antenna 916. The wireless communication interface 912 may also be a single chip module having the BB processor 913 and the RF circuit 914 integrated thereon. The wireless communication interface 912 may include the plurality of BB processors 913 and the plurality of RF circuits 914, as illustrated in FIG. 24. Note that, although FIG. 24 illustrates the example in which the wireless communication interface 912 includes the plurality of BB processors 913 and the plurality of RF circuits 914, the number of the BB processors 913 or RF circuits 914 of the wireless communication interface 912 may be one.

Furthermore, in addition to a cellular communication scheme, the wireless communication interface 912 may support other types of wireless communication schemes such as a short-distance wireless communication scheme, a near field communication scheme, and a wireless LAN (Local Area Network) scheme. In that case, the wireless communication interface 912 may include the BB processor 913 and the RF circuit 914 for each wireless communication scheme.

The antenna switches 915 each switch a connection destination of the corresponding antenna 916 among a plurality of circuits (for example, circuits for different wireless communication schemes) in the wireless communication interface 912.

The antennas 916 each include one or a plurality of antenna elements (for example, a plurality of antenna elements of a MIMO antenna), and are used when wireless signals are transmitted or received via the wireless communication interface 912. The smartphone 900 may include the plurality of antennas 916, as illustrated in FIG. 24. Note that, although FIG. 24 illustrates the example in which the smartphone 900 includes the plurality of antennas 916, the smartphone 900 may include one antenna 916.

In addition, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 24 via feeder lines, which are partially illustrated as dashed lines in FIG. 24. The auxiliary controller 919 operates the minimum necessary function of the smartphone 900 in a sleep mode, for example.

In the smartphone 900 illustrated in FIG. 24, one or more components in the terminal apparatus 200 (for example, processing unit 240), which are described with reference to FIG. 11, may be implemented by the wireless communication interface 912. Alternatively, at least some of these components may be implemented by the processor 901 or the auxiliary controller 919. As an example, the smartphone 900 may have mounted thereon a module including a part of the wireless communication interface 912 (for example, BB processor 913) or all components thereof, the processor 901, and/or the auxiliary controller 919, and the one or more components may be implemented by the module in question. In this case, the module may store a program for causing the processor to function as the one or more components (in other words, a program for causing the processor to execute operations of the one or more components), to thereby execute the program in question. As another example, the smartphone 900 may have installed thereon the program for causing the processor to function as the one or more components, and the wireless communication interface 912 (for example, BB processor 913), the processor 901, and/or the auxiliary controller 919 may execute the program in question. As described above, the smartphone 900 or the module may be provided as an apparatus including the one or more components, and the program for causing the processor to function as the one or more components may be provided. A readable recording medium having recorded thereon the program may also be provided.

Further, in the smartphone 900 illustrated in FIG. 24, for example, the wireless communication unit 220 described with reference to FIG. 11 may be implemented by the wireless communication interface 912 (for example, RF circuit 914). Further, the antenna unit 210 may be implemented by the antenna 916.

Second Application Example

Figure 25:
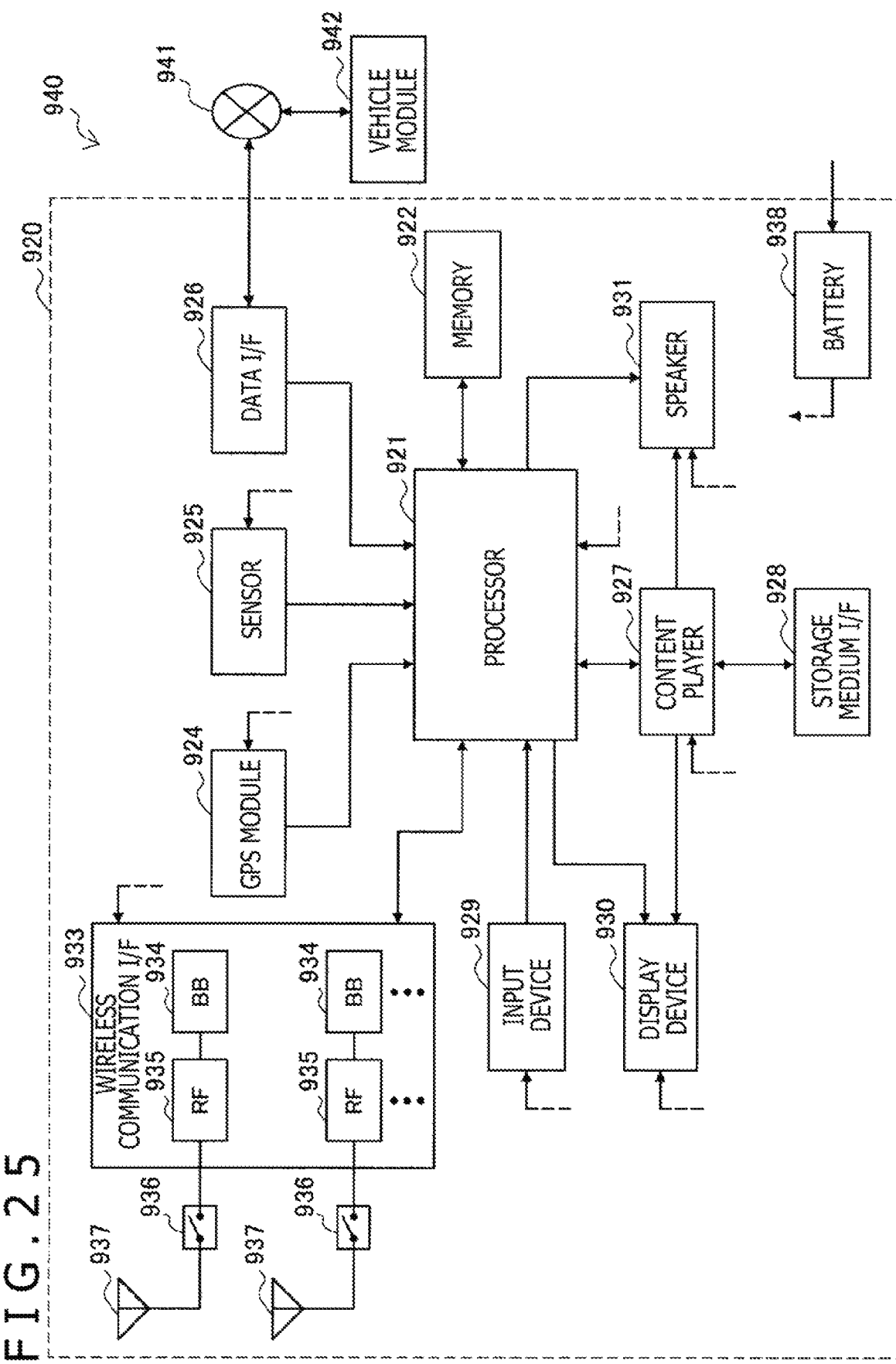
FIG. 25 is a block diagram illustrating an example of the schematic configuration of a car navigation apparatus 920 to which the technology according to the present disclosure may be applied.

FIG. 25 is a block diagram illustrating an example of the schematic configuration of a car navigation apparatus 920 to which the technology according to the present disclosure may be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation apparatus 920. The memory 922 includes a RAM and a ROM, and stores a program that is executed by the processor 921, and data.

The GPS module 924 uses GPS signals received from GPS satellites to measure a position (for example, latitude, longitude, and altitude) of the car navigation apparatus 920. The sensor 925 may include a group of sensors such as a gyro sensor, a geomagnetic sensor, and a barometric sensor. The data interface 926 is connected to an in-vehicle network 941 via a terminal that is not illustrated, for example, and acquires data generated by a vehicle, such as vehicle speed data.

The content player 927 reproduces content stored in a storage medium (for example, CD or DVD) that is inserted into the storage medium interface 928. The input device 929 includes, for example, a touch sensor configured to detect touch onto a screen of the display device 930, a button, or a switch, and receives an operation or information input from a user. The display device 930 includes a screen such as an LCD or an OLED display, and displays an image of the navigation function or content that is reproduced. The speaker 931 outputs sound of the navigation function or the content that is reproduced.

The wireless communication interface 933 supports any cellular communication scheme such as LTE or LTE-Advanced, and executes wireless communication. The wireless communication interface 933 may typically include, for example, a BB processor 934 and an RF circuit 935. The BB processor 934 may perform, for example, encoding/decoding, modulating/demodulating, and multiplexing/demultiplexing, to thereby execute various types of signal processing for wireless communication. Meanwhile, the RF circuit 935 may include, for example, a mixer, a filter, and an amplifier, and transmits and receives wireless signals via the antenna 937. The wireless communication interface 933 may be a single chip module having the BB processor 934 and the RF circuit 935 integrated thereon. The wireless communication interface 933 may include the plurality of BB processors 934 and the plurality of RF circuits 935, as illustrated in FIG. 25. Note that, although FIG. 25 illustrates the example in which the wireless communication interface 933 includes the plurality of BB processors 934 and the plurality of RF circuits 935, the number of the BB processors 934 or RF circuits 935 of the wireless communication interface 933 may be one.

Furthermore, in addition to a cellular communication scheme, the wireless communication interface 933 may support other types of wireless communication schemes such as a short-distance wireless communication scheme, a near field communication scheme, and a wireless LAN scheme. In that case, the wireless communication interface 933 may include the BB processor 934 and the RF circuit 935 for each wireless communication scheme.

The antenna switches 936 each switch a connection destination of the corresponding antenna 937 among plural circuits (for example, circuits for different wireless communication schemes) in the wireless communication interface 933.

The antennas 937 each include one or a plurality of antenna elements (for example, a plurality of antenna elements of a MIMO antenna), and are used when wireless signals are transmitted or received via the wireless communication interface 933. The car navigation apparatus 920 may include the plurality of antennas 937, as illustrated in FIG. 25. Note that, although FIG. 25 illustrates the example in which the car navigation apparatus 920 includes the plurality of antennas 937, the car navigation apparatus 920 may include one antenna 937.

In addition, the car navigation apparatus 920 may include the antenna 937 for each wireless communication scheme. In that case, the antenna switches 936 may be omitted from the configuration of the car navigation apparatus 920.

The battery 938 supplies electric power to each block of the car navigation apparatus 920 illustrated in FIG. 25 via feeder lines that are partially illustrated as dashed lines in FIG. 25. Further, the battery 938 accumulates electric power supplied from the vehicle.

In the car navigation apparatus 920 illustrated in FIG. 25, one or more components in the terminal apparatus 200 (for example, processing unit 240), which are described with reference to FIG. 11, may be implemented by the wireless communication interface 933. Alternatively, at least some of these components may be implemented by the processor 921. As an example, the car navigation apparatus 920 may have mounted thereon a module including a part of the wireless communication interface 933 (for example, BB processor 934) or all components thereof, and/or the processor 921, and the one or more components may be implemented by the module in question. In this case, the module may store a program for causing the processor to function as the one or more components (in other words, a program for causing the processor to execute operations of the one or more components), to thereby execute the program in question. As another example, the car navigation apparatus 920 may have installed thereon the program for causing the processor to function as the one or more components, and the wireless communication interface 933 (for example, BB processor 934) and/or the processor 921 may execute the program in question. As described above, the car navigation apparatus 920 or the module may be provided as an apparatus including the one or more components, and the program for causing the processor to function as the one or more components may be provided. A readable recording medium having recorded thereon the program may also be provided.

Further, in the car navigation apparatus 920 illustrated in FIG. 25, for example, the wireless communication unit 220 described with reference to FIG. 11 may be implemented by the wireless communication interface 912 (for example, RF circuit 914). Further, the antenna unit 210 may be implemented by the antenna 916.

Further, the technology according to the present disclosure may also be realized as an in-vehicle system (or vehicle) 940 including the one or more blocks of the car navigation apparatus 920, the in-vehicle network 941, and a vehicle module 942. The vehicle module 942 generates vehicle data such as vehicle speed, engine speed, or trouble information, and outputs the generated data to the in-vehicle network 941.

Note that, the eNBs in the above description may each be a gNB (gNodeB or next generation Node B).

3. Conclusion

As described above, according to the embodiment of the present disclosure, there is provided the base station 100 or the terminal apparatus 200 that can reduce resources that are used in executing the beam sweeping process.

The respective steps of the processing that is executed by each apparatus described herein are not necessarily performed in chronological order in the order illustrated in the sequence diagrams or the flowcharts. For example, the respective steps of the processing that is executed by each apparatus may be performed in an order different from the order illustrated in the flowcharts or performed in parallel to each other.

Further, a computer program for causing hardware incorporated in each apparatus, such as a CPU, a ROM, and a RAM, to demonstrate the functions equivalent to the configurations of the apparatus can be created. Further, a storage medium having the computer program stored thereon can be provided. Further, with the respective functional blocks in the functional block diagrams achieved by hardware, a series of processes can be implemented by the hardware.

The preferred embodiment of the present disclosure is described in detail so far with reference to the attached drawings, but the technical scope of the present disclosure is not limited to the example. It is apparent that various changes or modifications could be arrived at by persons who have ordinary knowledge in the technical field to which the present disclosure belongs within the scope of the technical ideas described in the appended claims, and it is therefore understood that such changes or modifications naturally belong to the technical scope of the present disclosure.

Further, the effects described herein are merely illustrative or exemplary and are not limited. That is, the technology according to the present disclosure may provide other effects that are obvious for persons skilled in the art from the description of the present specification, in addition to the above-mentioned effects or instead of the above-mentioned effects.

Note that the following configurations also belong to the technical scope of the present disclosure.

(1) A communication apparatus including:
a control unit configured to change a setting of scan with a directional beam between beam groups each including a plurality of the directional beams,
in which the control unit adjusts the setting of the scan with the directional beam of each of the beam groups depending on a status of an area that the beam group covers.

(2) The communication apparatus according to Item (1), in which the control unit sets, as the setting, the number of the directional beams of the beam group.

(3) The communication apparatus according to Item (1) or (2), in which the control unit sets, as the setting, a period of the scan by the beam group.

(4) The communication apparatus according to any one of Items (1) to (3), in which the control unit sets, as the setting, output electric power from the directional beam of the beam group.

(5) The communication apparatus according to any one of Items (1) to (4), in which the control unit makes the communication apparatus transmit information associated with the beam group.

(6) The communication apparatus according to Item (5), in which the control unit makes the communication apparatus transmit information associated with a period of the scan as the information associated with the beam group.

(7) The communication apparatus according to Item (5) or (6), in which the control unit makes the communication apparatus transmit, as the information associated with the beam group, information regarding a beam group that a terminal apparatus configured to receive the directional beam is to observe.

(8) The communication apparatus according to Item (7), in which the control unit includes, in the information regarding a beam group to observe, information regarding a base station configured to output the directional beam.

(9) The communication apparatus according to Item (7) or (8), in which the control unit includes, in the information regarding a beam group to observe, information associated with a characteristic of the terminal apparatus.

(10) The communication apparatus according to Item (9), in which the control unit includes, in the information associated with the characteristic of the terminal apparatus, information associated with a movement state of the terminal apparatus.

(11) The communication apparatus according to any one of Items (5) to (10), in which the control unit makes the communication apparatus transmit, as the information associated with the beam group, information associated with evaluation of the beam group by a terminal apparatus configured to receive the directional beam.

(12) The communication apparatus according to any one of Items (5) to (11), in which the control unit makes the communication apparatus transmit the information associated with the beam group once per predetermined plural times of scan.

(13) The communication apparatus according to any one of Items (1) to (12), in which the beam group includes a plurality of directional beams in directions adjacent to each other.

(14) The communication apparatus according to any one of Items (1) to (13), in which the beam group includes the directional beams from a plurality of base stations.

(15) The communication apparatus according to any one of Items (1) to (14), in which the communication apparatus is included in a base station.

(16) The communication apparatus according to any one of Items (1) to (14), in which the communication apparatus is provided to a terminal configured to wirelessly communicate with the base station with the directional beam.

(17) A communication control method including:
changing, by a processor, a setting of scan with a directional beam between beam groups each including a plurality of the directional beams; and
adjusting, by the processor, the setting of the scan with the directional beam of each of the beam groups depending on a status of an area that the beam group covers.

(18) A computer program for causing a computer to execute:
changing a setting of scan with a directional beam between beam groups each including a plurality of the directional beams; and
adjusting the setting of the scan with the directional beam of each of the beam groups depending on a status of an area that the beam group covers.

REFERENCE SIGNS LIST

100 Base station
200 Terminal apparatus

The invention claimed is:

1. A base station apparatus comprising:
a transceiver; and
control circuitry configured to:
transmit multiple beams via the transceiver to a terminal apparatus,
generate beam group related information,
transmit the generated beam group related information to the terminal apparatus,
wherein the generated beam group related information contains:
a beam group identifier of a first beam group of the multiple beams and a beam group identifier of a second beam group of the multiple beams,
a time period when both of the first beam group and the second beam group can be observed by the terminal apparatus and offset information indicating a beginning frame number of the time period,
information indicating a base station transmission power of each beam of the multiple beams, and
information indicating, from among the first and second beam groups, which beam group is a beam group for deciding a desirable beam and which beam group serves as an interference signal for deciding the desirable beam, and
receive, from the terminal apparatus, a report including channel quality information related to a beam group evaluation performed by the terminal apparatus based the beam group related information,
wherein the control circuitry is further configured to change at least one of the beam group related information in accordance with a respective beam group channel status parameter.

2. The base station apparatus according to claim 1, wherein the base station apparatus is a base station apparatus itself or a Remote Radio Head (RRH) as a part of the base station apparatus.

3. The base station apparatus according to claim 1, wherein the beam group related information further comprises a scan period.

4. The base station apparatus according to claim 1, wherein the report further includes feedback about a receivable modulation method and encoding rate of the desirable beam.

5. The base station apparatus according to claim 1, wherein the control circuitry is configured to communicate with the terminal apparatus via the desirable beam decided by the terminal apparatus based on the beam group related information.

6. The base station apparatus according to claim 1, wherein the control circuitry is configured to:
receive, from the terminal apparatus, an updated report that identifies a change to the desirable beam, the change based on the change to the at least one of the beam group related information, and
communicate with the terminal apparatus in accordance with the updated report.

7. The base station apparatus according to claim 1, wherein the report further identifies the desirable beam decided by the terminal apparatus based on the beam group related information.

8. A communication control method performed by a base station apparatus that includes a transceiver and a processor, the method comprising:
transmitting multiple beams via the transceiver to a terminal apparatus;
generating beam group related information;
transmitting the generated beam group related information to the terminal apparatus,
wherein the generated beam group related information contains:
a beam group identifier of a first beam group of the multiple beams and a beam group identifier of a second beam group of the multiple beams,
a time period when both of the first beam group and the second beam group can be observed by the terminal apparatus and offset information indicating a beginning frame number of the time period, information indicating a base station transmission power of each beam of the multiple beams, and information indicating, from among the first and second beam groups, which beam group is a beam group for deciding a desirable beam and which beam group serves as an interference signal for deciding the desirable beam, and receiving, from the terminal apparatus, a report including channel quality information related to a beam group evaluation performed by the terminal apparatus based the beam group related information, wherein the method further comprises changing at least one of the beam group related information in accordance with a respective beam group channel status parameter.

9. The method of claim 8, further comprising:
communicating with the terminal apparatus via the desirable beam decided by the terminal apparatus based on the beam group related information.

10. The method of claim 8, further comprising:
receiving, from the terminal apparatus, an updated report that identifies a change to the desirable beam, the change based on the change to the at least one of the beam group related information, and communicating with the terminal apparatus in accordance with the updated report.

11. The method of claim 8, wherein the report further identifies the desirable beam decided by the terminal apparatus based on the beam group related information.

12. A terminal apparatus comprising:
a transceiver; and
control circuitry configured to:
  receive multiple beams via the transceiver from a base station,
  receive, from the base station, beam group related information generated by the base station,
  wherein the generated beam group related information contains:
    a beam group identifier of a first beam group of the multiple beams and a beam group identifier of a second beam group of the multiple beams,
    a time period when both of the first beam group and the second beam group can be observed by the terminal apparatus and offset information indicating a beginning frame number of the time period,
    information indicating a base station transmission power of each beam of the multiple beams, and
    information indicating, from among the first and second beam groups, which beam group is a beam group for deciding a desirable beam and which beam group serves as an interference signal for deciding the desirable beam,
  perform a beam group evaluation based the beam group related information, and
  transmit, to the base station, a report including channel quality information related to the beam group evaluation.

13. The terminal apparatus according to claim 12, wherein the control circuitry is configured to communicate with the base station via the desirable beam decided by the terminal apparatus based on the beam group related information.

14. The terminal apparatus according to claim 12, wherein the control circuitry is configured to:
transmit, to the base station, an updated report that identifies a change to the desirable beam, the change based on a change to the at least one of the beam group related information, and communicate with the base station in accordance with the updated report.

15. The terminal apparatus according to claim 12, wherein the report further identifies the desirable beam decided by the terminal apparatus based on the beam group related information.

16. A method for a terminal apparatus that comprises a transceiver and a processor, the method comprising:
receiving multiple beams via the transceiver from a base station,
receiving, from the base station, beam group related information generated by the base station,
wherein the generated beam group related information contains:
  a beam group identifier of a first beam group of the multiple beams and a beam group identifier of a second beam group of the multiple beams,
  a time period when both of the first beam group and the second beam group can be observed by the terminal apparatus and offset information indicating a beginning frame number of the time period,
  information indicating a base station transmission power of each beam of the multiple beams, and
  information indicating, from among the first and second beam groups, which beam group is a beam group for deciding a desirable beam and which beam group serves as an interference signal for deciding the desirable beam;
performing a beam group evaluation based the beam group related information; and
transmitting, to the base station, a report including channel quality information related to the beam group evaluation.

17. The method of claim 16, further comprising:
communicating with the base station via the desirable beam decided by the terminal apparatus based on the beam group related information.

18. The method of claim 16, further comprising:
transmitting, to the base station, an updated report that identifies a change to the desirable beam, the change based on a change to the at least one of the beam group related information, and communicating with the base station in accordance with the updated report.

19. The method of claim 16, wherein the report further identifies the desirable beam decided by the terminal apparatus based on the beam group related information.

* * * * *